US011835999B2

(12) United States Patent
Shapira et al.

(10) Patent No.: US 11,835,999 B2
(45) Date of Patent: Dec. 5, 2023

(54) CONTROLLER WHICH ADJUSTS CLOCK FREQUENCY BASED ON RECEIVED SYMBOL RATE

(71) Applicant: MELLANOX TECHNOLOGIES, LTD., Yokneam (IL)

(72) Inventors: Bar Shapira, Yokneam (IL); Ariel Almog, Yokneam (IL); Dotan David Levi, Yokneam (IL); Natan Manevich, Yokneam (IL); Thomas Kernen, Yokneam (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 22 days.

(21) Appl. No.: 17/578,115

(22) Filed: Jan. 18, 2022

(65) Prior Publication Data

US 2023/0229188 A1 Jul. 20, 2023

(51) Int. Cl.
*G06F 1/10* (2006.01)
*G06F 13/40* (2006.01)

(52) U.S. Cl.
CPC ............ *G06F 1/10* (2013.01); *G06F 13/4022* (2013.01); *G06F 2213/3808* (2013.01)

(58) Field of Classification Search
CPC .......... G06F 1/10; G06F 1/12; G06F 13/4022; G06F 2213/2808; H04J 3/0685; H04W 56/001
See application file for complete search history.

(56) References Cited

U.S. PATENT DOCUMENTS

| | | |
|---|---|---|
| 5,392,421 A | 2/1995 | Lennartsson |
| 5,402,394 A | 3/1995 | Turski |
| 5,416,808 A | 5/1995 | Witsman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |
| 6,556,638 B1 | 4/2003 | Blackburn |
| 6,918,049 B2 | 7/2005 | Lamb et al. |
| 7,111,184 B2 | 9/2006 | Thomas, Jr. et al. |

(Continued)

FOREIGN PATENT DOCUMENTS

| | | |
|---|---|---|
| CN | 106817183 | 6/2017 |
| CN | 108829493 | 11/2018 |

(Continued)

OTHER PUBLICATIONS

U.S. Appl. No. 17/359,667, filed Jun. 28, 2021, Levi et al.

(Continued)

*Primary Examiner* — Glenn A. Auve
(74) *Attorney, Agent, or Firm* — Sheridan Ross P.C.

(57) ABSTRACT

A system is disclosed that includes two or more network elements, each comprising a Precision Time Protocol (PTP) Hardware Clock (PHC) that is adjustable based, at least in part, on physical layer frequency information.

22 Claims, 14 Drawing Sheets

(56) References Cited

U.S. PATENT DOCUMENTS

| | | |
|---|---|---|
| 7,191,354 B2 | 3/2007 | Purho |
| 7,245,627 B2 | 7/2007 | Goldenberg et al. |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari et al. |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,824,903 B2 | 9/2014 | Christensen |
| 8,879,552 B2 | 11/2014 | Zheng et al. |
| 8,930,647 B1 | 1/2015 | Smith |
| 9,344,265 B2 | 5/2016 | Karnes |
| 9,397,960 B2 | 7/2016 | Arad et al. |
| 9,753,854 B1 | 9/2017 | Bao |
| 9,942,025 B2 * | 4/2018 | Bosch .................. H04B 1/38 |
| 9,979,998 B1 | 5/2018 | Pogue et al. |
| 10,027,601 B2 | 7/2018 | Narkis et al. |
| 10,054,977 B2 | 8/2018 | Mikhalov et al. |
| 10,095,543 B1 | 10/2018 | Griffin et al. |
| 10,148,258 B2 | 12/2018 | Carlson et al. |
| 10,164,759 B1 | 12/2018 | Volpe |
| 10,320,646 B2 | 6/2019 | Mirsky et al. |
| 10,515,045 B1 | 12/2019 | Mattina |
| 10,637,776 B2 | 4/2020 | Iwasaki |
| 10,727,966 B1 | 7/2020 | Izenberg et al. |
| 10,778,361 B1 | 9/2020 | Almog et al. |
| 10,778,406 B2 | 9/2020 | Gaist et al. |
| 10,841,243 B2 | 11/2020 | Levi et al. |
| 10,879,910 B1 | 12/2020 | Franck et al. |
| 10,887,077 B1 | 1/2021 | Ivry |
| 11,070,224 B1 | 7/2021 | Faig et al. |
| 11,070,304 B1 | 7/2021 | Levi et al. |
| 11,128,500 B1 | 9/2021 | Mentovich et al. |
| 11,157,433 B2 | 10/2021 | Lederman et al. |
| 11,240,079 B1 | 2/2022 | Kushnir et al. |
| 11,303,363 B1 | 4/2022 | Mohr et al. |
| 11,336,383 B2 | 5/2022 | Mula et al. |
| 11,368,768 B2 | 6/2022 | Bakopoulos et al. |
| 11,379,334 B1 | 7/2022 | Srinivasan et al. |
| 11,388,263 B2 | 7/2022 | Levi et al. |
| 11,476,928 B2 | 10/2022 | Levi et al. |
| 2001/0006500 A1 | 7/2001 | Nakajima et al. |
| 2002/0027886 A1 | 3/2002 | Fischer et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0172181 A1 | 8/2005 | Huliehel |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0257458 A1 | 10/2009 | Cui et al. |
| 2010/0280858 A1 | 11/2010 | Bugenhagen |
| 2011/0182191 A1 | 7/2011 | Jackson |
| 2012/0063556 A1 | 3/2012 | Hoang |
| 2012/0076319 A1 | 3/2012 | Terwal |
| 2013/0039359 A1 * | 2/2013 | Bedrosian .............. H04J 3/0667 370/350 |
| 2013/0045014 A1 | 2/2013 | Mottahedin et al. |
| 2013/0294144 A1 | 11/2013 | Wang et al. |
| 2013/0315265 A1 | 11/2013 | Webb, III et al. |
| 2014/0153680 A1 | 6/2014 | Garg et al. |
| 2014/0185632 A1 | 7/2014 | Steiner et al. |
| 2014/0253387 A1 | 9/2014 | Gunn et al. |
| 2014/0321285 A1 | 10/2014 | Chew et al. |
| 2015/0078405 A1 | 3/2015 | Roberts |
| 2015/0092793 A1 * | 4/2015 | Aweya .................. H04J 3/0667 370/503 |
| 2015/0127978 A1 | 5/2015 | Cui et al. |
| 2015/0318941 A1 | 11/2015 | Zheng et al. |
| 2016/0072602 A1 | 3/2016 | Earl et al. |
| 2016/0110211 A1 | 4/2016 | Karnes |
| 2016/0277138 A1 | 9/2016 | Garg et al. |
| 2016/0285574 A1 * | 9/2016 | White .................... H04L 69/18 |
| 2016/0315756 A1 | 10/2016 | Tenea et al. |
| 2017/0005903 A1 | 1/2017 | Mirsky et al. |
| 2017/0017604 A1 | 1/2017 | Chen et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0191802 A1 | 7/2018 | Yang et al. |
| 2018/0227067 A1 | 8/2018 | Hu et al. |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0169379 A1 | 5/2020 | Gaist et al. |
| 2020/0235905 A1 | 7/2020 | Su et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0141413 A1 | 5/2021 | Levi et al. |
| 2021/0218431 A1 | 7/2021 | Narayanan et al. |
| 2021/0243140 A1 | 8/2021 | Levi et al. |
| 2021/0288785 A1 | 9/2021 | Faig et al. |
| 2021/0297151 A1 | 9/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2021/0409031 A1 * | 12/2021 | Ranganathan ........ H03L 7/1974 |
| 2022/0006606 A1 | 1/2022 | Levi et al. |
| 2022/0021393 A1 | 1/2022 | Ravid et al. |
| 2022/0066978 A1 | 3/2022 | Mishra et al. |
| 2022/0086105 A1 | 3/2022 | Levi et al. |
| 2022/0173741 A1 | 6/2022 | Ravid et al. |
| 2022/0191275 A1 | 6/2022 | Levi et al. |
| 2022/0121691 A1 | 7/2022 | Mentovich et al. |
| 2022/0224500 A1 | 7/2022 | Mula et al. |
| 2022/0342086 A1 | 10/2022 | Yoshida |
| 2022/0352998 A1 | 11/2022 | Levi et al. |
| 2022/0357763 A1 | 11/2022 | Levy et al. |
| 2022/0360423 A1 | 11/2022 | Levi et al. |
| 2022/0385598 A1 | 12/2022 | Pismenny et al. |

FOREIGN PATENT DOCUMENTS

| | | |
|---|---|---|
| EP | 1215559 | 9/2007 |
| EP | 2770678 | 8/2014 |
| JP | 2011-091676 | 5/2011 |

(56) References Cited

FOREIGN PATENT DOCUMENTS

| TW | 498259 | 8/2002 |
|---|---|---|
| WO | WO 2012/007276 | 1/2012 |
| WO | WO 2013/124782 | 8/2013 |
| WO | WO 2013/143112 | 10/2013 |
| WO | WO 2014/029533 | 2/2014 |

OTHER PUBLICATIONS

U.S. Appl. No. 17/520,674, filed Nov. 7, 2021, Wasko et al.
U.S. Appl. No. 17/534,776, filed Nov. 24, 2021, Shapira et al.
U.S. Appl. No. 17/549,949, filed Dec. 14, 2021, Wasko et al.
U.S. Appl. No. 17/579,630, filed Jan. 20, 2022, Manevich et al.
U.S. Appl. No. 17/582,058, filed Jan. 24, 2022, Wasko et al.
U.S. Appl. No. 17/667,600, filed Feb. 9, 2022, Levi et al.
U.S. Appl. No. 17/858,236, filed Jul. 6, 2022, Kernen et al.
U.S. Appl. No. 17/868,841, filed Jul. 20, 2022, Levi et al.
U.S. Appl. No. 17/871,937, filed Jul. 24, 2022, Levi et al.
U.S. Appl. No. 17/885,604, filed Aug. 11, 2022, Manevich et al.
"Can Altera GX/GT/GZ device high speed transceivers handle Spread Spectrum Clocking (SSC), as required by PCIe or SATA/SAS protocols?" Intel Corporation, Sep. 11, 2012, 2 pages [retrieved online Oct. 26, 2022 from: www.intel.com/content/www/us/en/support/programmable/articles/000079683.html].
"Distribution of timing information through packet networks," International Telecommunication Union, Aug. 2017, Recommendation ITU-T G.8264/Y.1364, 42 pages.
"How to test 1PPS on Mellanox Adapters" Mellanox Technologies, 2019, 7 pages [retrieved online Oct. 26, 2022 from community.mellanox.com/s/article/How-To-Test-1PPS-on-Mellanox-Adapters].
"IEEE 1588 Primer," ip-clock.com, pp. 1-3, May 1, 2017 (retrieved online Oct. 26, 2022 from web.archive.org/web/20170501192647/http://ip-clock.com/IEEE-1588-primer/).
"LMK05318 Ultra-Low Jitter Network Synchronizer Clock With Two Frequency Domains," Texas Instruments, Dec. 2018, SNAS771A, 86 pages [retrieved online Oct. 26, 2022 from: www.ti.com/lit/ds/snas771a/snas771a.pdf?ts=1666725415863].
"PCI Express 3.1 JITTER Requirements" Skywork Solutions Inc., Sep. 2021, AN562, 16 pages.
"Precision Time Protocol," CISCO, Jul. 30, 2020, 52 pages [retrieved online Oct. 26, 2022 from: www.cisco.com/c/en/us/td/docs/dcn/aci/apic/5x/system-management-configuration/cisco-apic-system-management-configuration-guide-52x/m-precision-time-protocol.pdf].
"Timing and synchronization aspects in packet networks" International Telecommunication Union, Aug. 2019, Recommendation ITU-T G.8261/Y.1361, 120 pages.
"Timing characteristics of synchronousequipment slave clock," International Telecommunication Union, Nov. 2018, Recommendation ITU-T G.8262/Y.1362, 44 pages.
"Timing characteristics of telecom boundary clocks and telecom time slave clocks" International Telecommunication Union, Jan. 2017, Recommendation ITU-T G.8273.2/Y.1368.2, 50 pages.
Corbett et al. "Spanner: Google's Globally Distributed Database," ACM Transactions on Computer Systems, Aug. 2013, vol. 31, No. 3, Article 8, 22 pages.
Dlugy-Hegwer et al., "Designing and Testing IEEE 1588 Timing Networks", Symmetricom, pp. 1-10, Jan. 2007.
IEEE Standard 1588-2002, "IEEE Standard for a Precision Clock Synchronization Protocol for Networked Measurement and Control Systems", IEEE Instrumentation and Measurement Societ , pp. 1-154, Nov. 8, 2002.
IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul 24, 2008.
Infiniband Architecture: Specification vol. 1, pp. 1-1727, Release 1.2.1, Infiniband Trade Association, Nov. 2007.
Lu et al., "A Fast CRC Update Implementation", Computer Engineering Laboratory, Electrical Engineering Department, pp. 113-120, Oct. 8, 2003.
Mellanox Technologies, "Mellanox ConnectX IB: Dual-Port InfiniBand Adapter Cards with PCI Express 2.0", pp. 1-2, USA, year 2008.
Weibel et al., "Implementation and Performance of Time Stamping Techniques", 2004 Conference on IEEE 1588, Sep. 28, 2004, 15 pages.
Weibel, H., "High Precision Clock Synchronization according to IEEE 1588 Implementation and Performance Issues", Zurich University University of Sciences, pp. 1-9, Jan. 17, 2005.
Wikipedia—"Precision Time Protocol," Wikipedia, Aug. 24, 2019, 10 pages [retrieved online Oct. 26, 2022 from: en.wikipedia.org/w/index.php?title=Precision_Time_Protocol&oldid=912308324].
Working Draft Project American National Standard T10/1799-D, "Information Technology—SCSI Block Commands—3 (SBC-3)", pp. 1-220, Revision 19, May 29, 2009.
Zhang et al. "TI BAW technology enables ultra-low jitter clocks for high-speed networks," Texas Instruments, Feb. 2019, White Paper, SNOAA34, 11 pages [retrieved online from: www.ti.com/lit/wp/snoaa34/snoaa34.pdf?ts=1630651534227&ref_url=https%25253A%25252F%25252Fwww.google.com%25252F].

* cited by examiner

CONTROLLER WHICH ADJUSTS CLOCK FREQUENCY BASED ON RECEIVED SYMBOL RATE

FIELD

Certain embodiments relate to synchronization generally, and in particular to clock and/or frequency synchronization.

BACKGROUND

Known, e.g., from co-owned U.S. Pat. No. 10,778,406 to Gaist et al., is a "network device including frequency generation circuitry configured to generate a clock signal, a phase-locked loop configured to generate a local clock based on the clock signal, a plurality of receivers configured to receive respective data streams from respective remote clock sources, each receiver of the plurality of receivers being configured to recover a remote clock from a respective data stream, and a controller configured to identify the remote clock recovered by one of the plurality of receivers as a master clock, find a clock differential between the identified remote clock and the local clock, provide a control signal to the frequency generation circuitry responsively to the clock differential, which causes the frequency generation circuit to adjust the clock signal so as to iteratively reduce an absolute value of the clock differential."

SUMMARY OF THE DISCLOSURE

Certain embodiments seek to provide improved clock and/or frequency synchronization e.g., in network devices.

Certain embodiments seek to provide an improved system and method for disciplining a PHC (PTP Hardware Clock) or, generally, clock.

Certain embodiments seek to provide PHC frequency adjustments in at least one network device's PHC, based on the network's RX symbol rate, e.g., by updating the PHC's DPLL (digital phase-locked loop).

Certain embodiments seek to provide a system which assures accurate timing.

Certain embodiments seek to provide a system or sub-system that assures internal stability and/or accuracy between nodes of the system or sub-system.

Certain embodiments seek to provide improved network devices such as improved NICs (Network Interface Cards) including improved smart NICs, and/or improved switches.

Certain embodiments seek to improve the accuracy and/or stability over the PTP standard.

Certain embodiments seek to improve the SyncE standard.

Certain embodiments seek to relax SyncE hardware requirements.

Certain embodiments seek to maintain a PHC by maintaining accuracy and/or stability of the Precision Time Protocol (PTP) hardware clock's frequency. Providing the above controller is useful in maintaining accuracy and/or stability of the Precision Time Protocol (PTP) hardware clock's frequency. The term "clock accuracy" (or "clock frequency accuracy") as used herein describes an extent to which a clock's actual frequency matches or is equal to a specified clock frequency. The term "clock stability" (or "clock frequency stability") describes an extent to which a clock's oscillator frequency resists fluctuations. Variation in temperature is an example factor that may affect stability. Other factors that may affect stability include all or any subset of: aging of the clock's hardware, supply voltage to the clock, shock to or vibration of the clock, and capacitive load driven by the clock.

At least the following embodiments are included in the scope of the invention: Embodiment 1. A system, comprising: two or more network elements, each comprising a Precision Time Protocol (PTP) Hardware Clock (PHC) that is adjustable based, at least in part, on physical layer frequency information.

Embodiment 2. The system of any preceding embodiment, wherein the frequency information is extracted from an RX symbol rate.

Embodiment 3. The system of any preceding embodiment, wherein at least one of the two or more network elements comprise a cellular network element.

Embodiment 4. The system of any preceding embodiment, wherein the two or more network elements comprise a first antenna and a second antenna.

Embodiment 5. The system of any preceding embodiment, wherein at least one of the two or more network elements comprise a data center element belonging to a data center cluster.

Embodiment 6. The system of any preceding embodiment, wherein the data center element comprises a Top-of-Rack (ToR) switch.

Embodiment 7. The system of any preceding embodiment, wherein a switch extracts the frequency information to determine an ensemble time and wherein the ensemble time is used to adjust the PHC's frequency and it's TX symbol rate.

Embodiment 8. The system of any preceding embodiment, wherein the switch determines the ensemble time based on at least a first RX symbol rate received from at least a first network element and based on at least a second RX symbol rate received from at least a second network element.

Embodiment 9. The system of any preceding embodiment, wherein the two or more network elements belong to a subnetwork that includes a switch.

Embodiment 10. A cellular network, comprising: a first cellular network element comprising a first Precision Time Protocol (PTP) Hardware Clock (PHC) that is adjustable based, at least in part, on physical layer frequency information; and a second cellular network element comprising a second PHC that is adjustable based, at least in part, on the physical layer frequency information.

Embodiment 11. The cellular network of any preceding embodiment, wherein the frequency information is extracted from an RX symbol rate.

Embodiment 12. The cellular network of any preceding embodiment, wherein the RX symbol rate corresponds to an RX symbol rate of the first cellular network element and/or the second cellular network element.

Embodiment 13. The cellular network of any preceding embodiment, further comprising a switch, wherein a local clock at the switch is adjusted based on a weighted average of two or more RX symbol rates and wherein the local clock is used to align the first PHC and the second PHC.

Embodiment 14. The cellular network of any preceding embodiment, wherein the first cellular network element comprises a first antenna and wherein the second cellular network element comprises a second antenna.

Embodiment 15. The cellular network of any preceding embodiment, wherein the first cellular network element and the second cellular network element belong to a common micro cell.

Embodiment 16. The cellular network of any preceding embodiment, wherein the frequency information is extracted from a difference between an RX symbol rate and a TX symbol rate or from a difference between the RX symbol rate and the PHC.

Embodiment 17. A data center, comprising: a first network element and a second network element, wherein the first network element comprises a first Precision Time Protocol (PTP) Hardware Clock (PHC) that is adjustable based, at least in part, on physical layer frequency information and wherein the second network element comprises a second PHC that is adjustable based, at least in part, on the physical layer frequency information.

Embodiment 18. The data center of any preceding embodiment, wherein the first network element comprises a first Network Interface Controller (NIC) and wherein the second network element comprises a second NIC.

Embodiment 19. The data center of any preceding embodiment, wherein the physical layer frequency information is received from a switch.

Embodiment 20. The data center of any preceding embodiment, wherein the switch it external to a subnetwork containing the first network element and the second network element.

Embodiment 21. The data center of any preceding embodiment, wherein the frequency information is extracted from an RX symbol rate.

Embodiment 22. The data center of any preceding embodiment, wherein the extracted frequency information is used to determine an ensemble time and wherein the ensemble time is used to adjust the first PHC's frequency.

Embodiment 23. The data center of any preceding embodiment, wherein the ensemble time is used to adjust the second PHC's frequency.

Embodiment 24. The data center of any preceding embodiment, wherein the first and second network element are connected in a back-to-back configuration.

Embodiment 25. The data center of any preceding embodiment, wherein the first and second network element are connected in a ring topology.

DETAILED DESCRIPTION OF CERTAIN EMBODIMENTS

Figure 1:
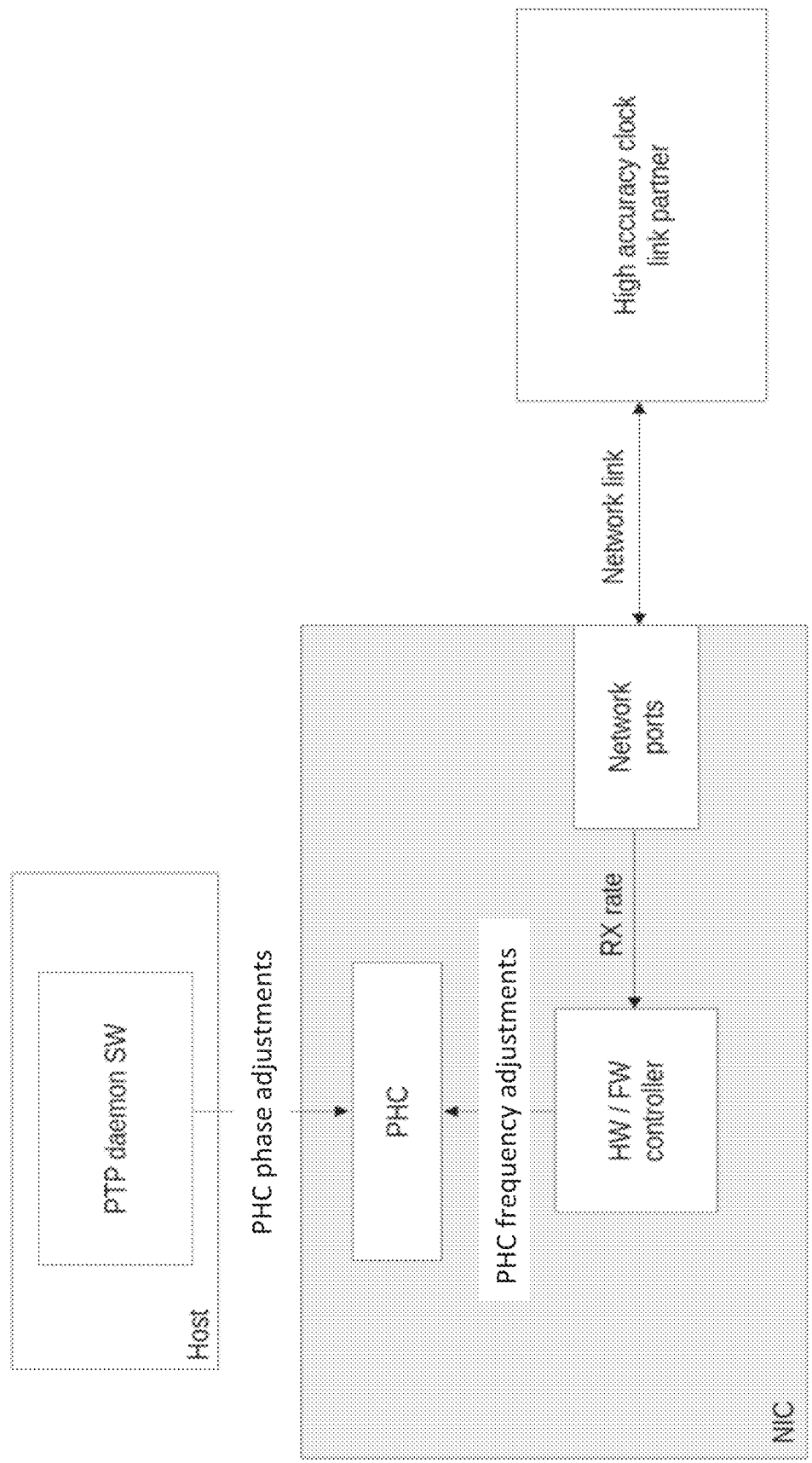
FIG. 1 illustrates a HW (hardware) architecture in which data extracted from the symbol rate may be used for adjustments to the PHC.

Synchronous Ethernet, aka SyncE, is a standard for computer networking which may be used to facilitate transferal of clock signals over Ethernet's physical layer. Synchronous Ethernet is described for example in the following https link: albedotelecom.com/src/lib/WP-SynE-explained.pdf. In SyncE, synchronization and transport networks may be partially mixed, e.g., if some network elements transmit data and also distribute clock signals to other network elements. Networks with SyncE may be of different topologies such as, most typically, tree/s and/or forest/s, or, by way of non-limiting example, ring or meshed topologies. In any network, SyncE clock hierarchy typically has a "Tree" topology, or a "Forest" topology including a disjoint union of trees. The SyncE clock hierarchy typically relies on a reference (aka master) clock which may be distributed to "slave" or follower clocks.

IEEE Std 1588™-2008 (1588v2) is a standard that defines the Precision Time Protocol (PTP) which may be used to distribute frequency, phase and time over packet based networks.

Clock synchronization, useful for computing machines having PTP clients, is described in published US application 2020/0162234 to Almog et al.

Clock synchronizer technology (such as, by way of non-limiting example, TI-BAW—Texas Instruments Bulk Acoustic Wave technology) enables ultra-low jitter clocks for highspeed networks e.g., as described in the following online white paper: ti.com/lit/wp/snoaa34/snoaa34.pdf?ts=1630651534227&ref_url=https%253A%252F%252Fwww.google.com%252F.

Time synchronization and frequency synchronization (aka syntonization) among network (e.g., connected via Ethernet, or any other appropriate network) devices may be used in many network applications. One application of using a synchronized clock value is for measuring latency between two devices. If the clocks are not synchronized, the resulting latency measurement will be inaccurate.

Two standards have been developed in view of the above: (a) PTP (Precision Time Protocol) and (b) SyncE (Synchronous Ethernet). The PTP is a standard targeting clock synchronization whereas SyncE is a standard to enhance the PTP stability and discipline the crystal oscillator (XO).

PTP provides a protocol that aligns the host time and frequency to an external clock (called PTP Master). Distribution of time and frequency over the network occurs by transmitting time-stamped packets. When using PTP, the adjustment of the local clock frequency does not have to be using a physical changing of the oscillator frequency (e.g., an analog implementation); it can use a fixed frequency local oscillator, compute the ratio of the PTP master and local rates, and multiply the fixed local clock by this ratio (e.g., a digital implementation).

SyncE is an International Telecommunication Union Telecommunication (ITU-T) Standardization Sector standard for computer networking that facilitates the transference of clock signals over the Ethernet physical layer. In particular, SyncE enables clock synchronization inside a network with respect to a SyncE master frequency source. Each network element (e.g., a switch, a network interface card (NIC), or router) needs to recover the master clock from highspeed data received from the master device clock source and use the recovered master clock for its data transmission in a manner such that the master clock spreads throughout the network. This typically requires analog implementation.

The SyncE synchronization hierarchy is typically managed over a dedicated Ethernet channel (ESMC—Ethernet Synchronization Messaging Channel). The messages in this channel typically carry information regarding the source clock this timing flow is spreading. This information, aka "timing source information", typically includes the quality level (QL) of the source clock.

Problems when using PTP synchronization without SyncE may include the following:

1. In the interval between sync messages, the local oscillator may drift, resulting in a time offset between the device and the PTP master.

2. During the exchange of sync messages, the local oscillator may drift. If the device and the master are not syntonized during the exchange of sync messages, the PTP synchronization will be less accurate.

3. Typically, if PTP messages are not available (e.g., PTP holdover), the device quickly gets out of sync.

This can be improved by (a) increasing the rate of sync messages at the cost of wasting network resources and/or (b) by using a better, or more costly, local oscillator.

Figure 9:
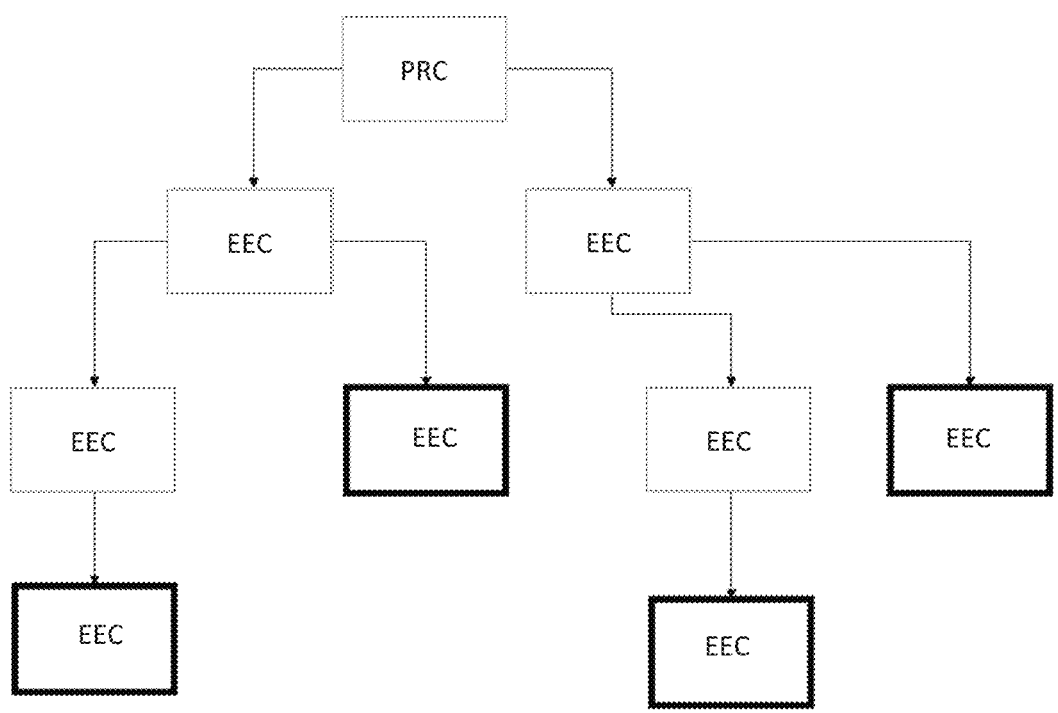
FIG. 9 is a simplified block diagram illustration of a SyncE tree including one PRC (Primary Reference Clock) and plural EEC (Ethernet Equipment Clock) devices. The arrows indicate the timing flow; the tree's "leaves" are shown in in bold.

Embodiments herein are low-cost, and do not require a network load. In addition, typically, when using SyncE, each SyncE device may need dedicated, costly HW, such as a jitter attenuator PLL, to allow the SyncE device to spread the master frequency throughout the network using data transmission. In contrast, applying embodiments described herein for leaves in the SyncE tree (e.g., the tree of FIG. 9) could yield similar performance at lower cost, even using legacy equipment.

In contrast, if HW board modifications are needed, e.g., to deploy a custom clock synchronizer on a board, this prevents applicability to existing deployments where a board with the custom clock synchronizer is not present.

The term "network peer oscillator frequency" is used herein to refer to the frequency of oscillation of an oscillator included in a "network peer"; the "network peer" is a network device serving as a local device's "peer" given that the network device is connected to the local device via a network.

According to certain embodiments, the network peer oscillator frequency is extracted from the RX symbol rate and the network peer oscillator frequency thus extracted is used to adjust the frequency of at least one network device's PHC (PTP Hardware Clock). It is appreciated that in contrast to PTP, frequency information is extracted from the RX symbol rate, rather than being encapsulated in packets, as in PTP. Extraction and adjustment may be implemented in firmware e.g., as described herein, however, alternatively, both (together or apart), or either, may be offloaded to hardware.

Even if this embodiment does not enable the device (e.g., a NIC as shown in FIG. 1, or a switch, or any other appropriate network device) to spread the master frequency throughout the network using data transmission, the embodiment is beneficial in various use-cases, such as but not limited to the following:

1. When the device is the last node in a SyncE timing flow (a leaf in the SyncE tree e.g., as shown in bold in FIG. 9)
2. In the absence of SyncE, when:
2a. One or more of the device's peers have a better oscillator than the device's local (own) oscillator; and/or
2b. One or more of the device's peers have their local clock rate syntonized to the reference or PTP master, using PTP (using an analog implementation); and/or
2c. There is a need for relative syntonization (e.g., syntonization between nodes and not to an absolute reference frequency) in a flat system (for example, when all nodes are connected to one switch).

Figure 7B:
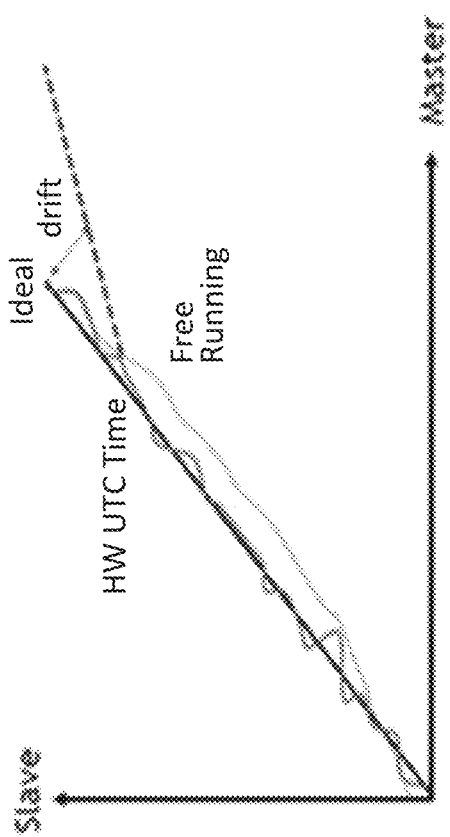
FIGS. 7a, 7b, and 7c each show graphs illustrating typical behavior of HW UTC Time using various synchronization methods.
Figure 7A:
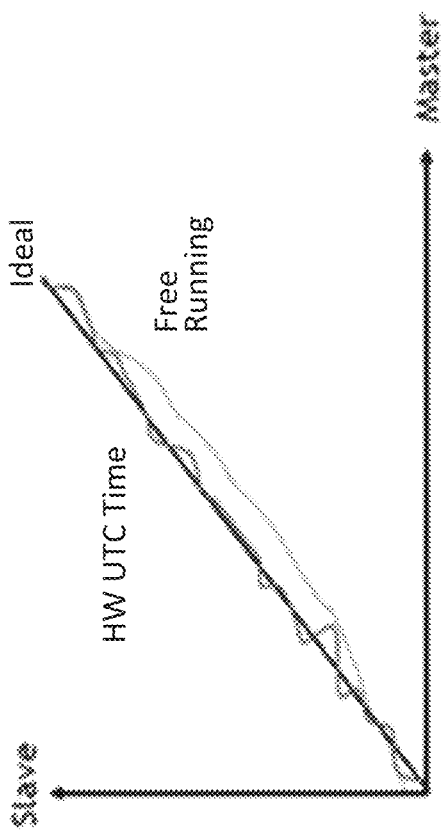
Figure 7C:
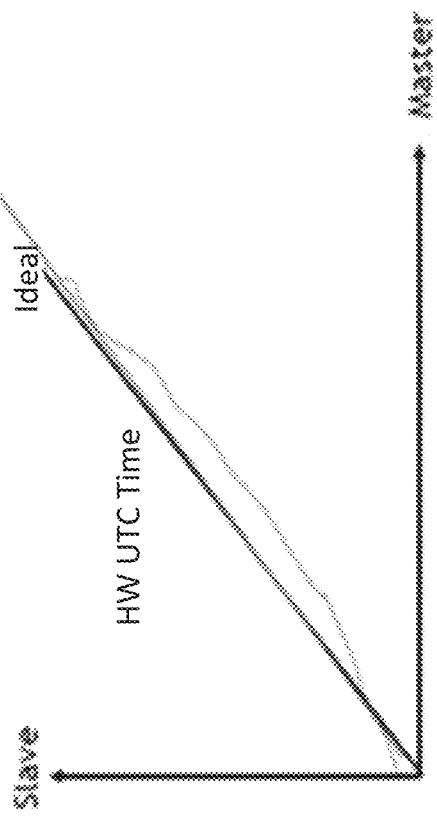

FIG. 7 shows graphs a, b, c illustrating typical behavior of HW UTC Time using different synchronization methods. In graph (a), the synchronization uses PTP. As shown, progress of the HW UTC Time is determined by the Free Running clock and is adjusted to the ideal time of the reference or master using PTP messages. Thus between messages, the HW UTC Time drifts, jittering around the ideal time of the reference or master. Graph (b) shows that in the case of a fault in the PTP, the HW UTC Time keeps on drifting. Graph (c) shows synchronization which uses both PTP and SyncE (or PTP and PHC frequency adjustments based on RX symbol rate). The frequency of the HW UTC Time is stable between PTP messages, thus less jittery.

FIG. 1 illustrates a HW architecture in which data extracted from the symbol rate may be used for adjustments to the PHC, as indicated by the arrow from the controller and the PHC in FIG. 1.

For example, the RX frequency and TX frequency (where RX and TX herein refer, respectively, to receipt by the local device, on which the embodiments herein may be implemented (such as the NIC illustrated, by way of non-limiting example, in FIGS. 1-6, or any other appropriate network device), and to transmission by that local device, e.g., from/to the local device's link partner/s) can be extracted from the physical layer (e.g., the Ethernet physical layer over which SyncE transfers clock signals). Then, based on—RX-TX frequency ratio and/or—RX-PHC frequency ratio, the PHC update rate can be updated. Typically, the internal Digital phase-locked loop (DPLL), which is internal to the local network device's PHC (e.g., that of FIG. 1) and may be responsible for translating the native frequency into PHC consecutive time update commands, is thus updated.

The term "DPLL" as used herein may be replaced by a reference to any control system that generates an output signal whose phase is related to the phase of an input signal, or any appropriate device which allows a changing rate or clock frequency to be expressed with reference to (e.g., computed in real time relative to) an original rate or frequency of a device's clock, or any appropriate hardware which updates the PHC and/or updates the PHC's and/or translates an internal clock frequency to a PHC update frequency, the PHC itself then typically being updated accordingly.

An example digital phase-locked loop is described in U.S. Pat. No. 11,070,214 to Franck et al.

Figure 4:
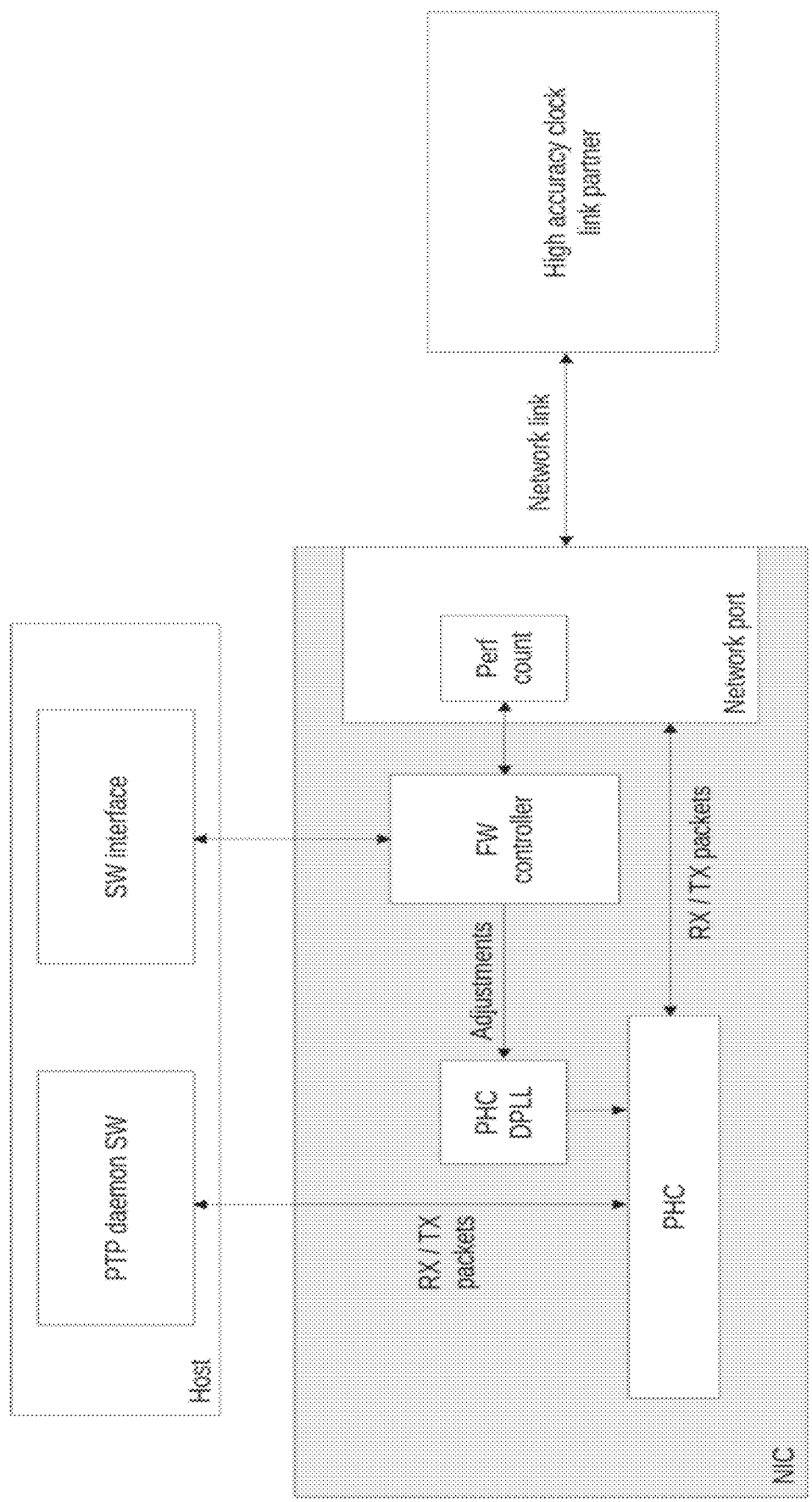
FIG. 4 is an example implementation of the embodiment of FIG. 1 which typically includes a packet time-stamping path, through the PHC.

A "link" is what provides data communication between network (aka net) elements or nodes. A link partner is a net element aka peer aka network node aka network device on the other side of the cable, e.g., as shown in FIGS. 1 and 4, which may or may not be SyncE.

A possible SW-HW/FW interface is a "set status" command, which tells the HW whether to track one of its network ports, or to ignore and use, say, an internal clock with default configuration.

A possible addition to such a SW-HW/FW interface is going to "holdover state", after a network node loses a high accuracy link partner (a partner whose clock has higher accuracy than the network node itself). This allows past information regarding the incoming rate to be used, in order to be more accurate than the default configuration of the system.

Generally, each PHC is typically owned by a specific software entity, such as, say, a container, process, or virtual machine. Thus, if a network device e.g., NIC has n PHC's, they are respectively owned by n software entities. Still with reference to FIG. 1, it is appreciated that according to certain embodiments, a given software entity or daemon which owns a given PHC determines or selects whether to perform phase adjustment (e.g., by activating or initiating the daemon) and/or whether to perform frequency adjustment (e.g., by activating or initiating a firmware or hardware controller implementing the frequency adjustment described herein. This decision may include a determination e.g., by the given software entity, of whether or not to act in accordance with received PTP messages.

It is appreciated that Precision Time Protocol (PTP) distributes frequency, phase and time over packet-based networks.

The term "daemon" e.g., in a multitasking computer operating system, is intended to include any computer program which runs as a background process, rather than being directly controlled by an interactive user. A daemon may, for example, be started at boot time and may perform task/s at scheduled times and/or responsive to certain network request/s and/or hardware activity and/or other programs.

The architecture of the PHC of FIG. 1 may be as described in any of the embodiments in co-pending United States Patent Application 20200162234 to Almog et al. or in co-owned U.S. Pat. No. 10,778,406 to Gaist et al.

It is appreciated that extraction of the network peer oscillator frequency from the RX symbol rate may be implemented in any appropriate type of physical network (such as, by way of non-limiting example, Ethernet, InfiniBand, PCIe, NVlink). Extraction may be implemented in FW or HW, e.g., to avoid SW to FW/HW interface jitter.

It is appreciated that typically, the RX symbol rate comprises a number of symbols that a local network device's controller receives per unit of time e.g., 1 second, where the unit of time is measured according to the local network device's controller's own clock.

Alternatively, the frequency difference could be measured using the difference between the number of received symbols and transmitted ones on the same lane. Since the number of transmitted symbols/sec is a result of the local frequency multiplied by a constant value it can be concluded that receiving more symbols than transmitting in the same period of time indicates that the local frequency is slower than the nominal frequency and local frequency should be raised. On the other hand, it can be concluded that receiving fewer symbols than transmitting in the same period of time indicates that the local frequency is faster than the nominal frequency and the local frequency should be lowered. This is applicable when the PHC and the serdes PHY are fed from the same clock source. Extraction, and/or use of the network peer oscillator frequency thus extracted to adjust the frequency of at least one network device's PHC, may occur periodically. For example, dozens of corrections, or hundreds, or thousands, or more, or less, may be made per second.

The periodic extracting of the network peer oscillator frequency and/or using the network peer oscillator frequency to adjust PHC frequency, may be triggered, at a given link port, by a SW component, which may, for example, provide a message indicating availability of a clock link-partner, whose accuracy is higher than the local clock (and typically higher than at least one other, or most other, or all other link-partner/s that the network device may have). This message may trigger the "extract and use" mechanism shown and described herein, on the given link port.

Figure 2:
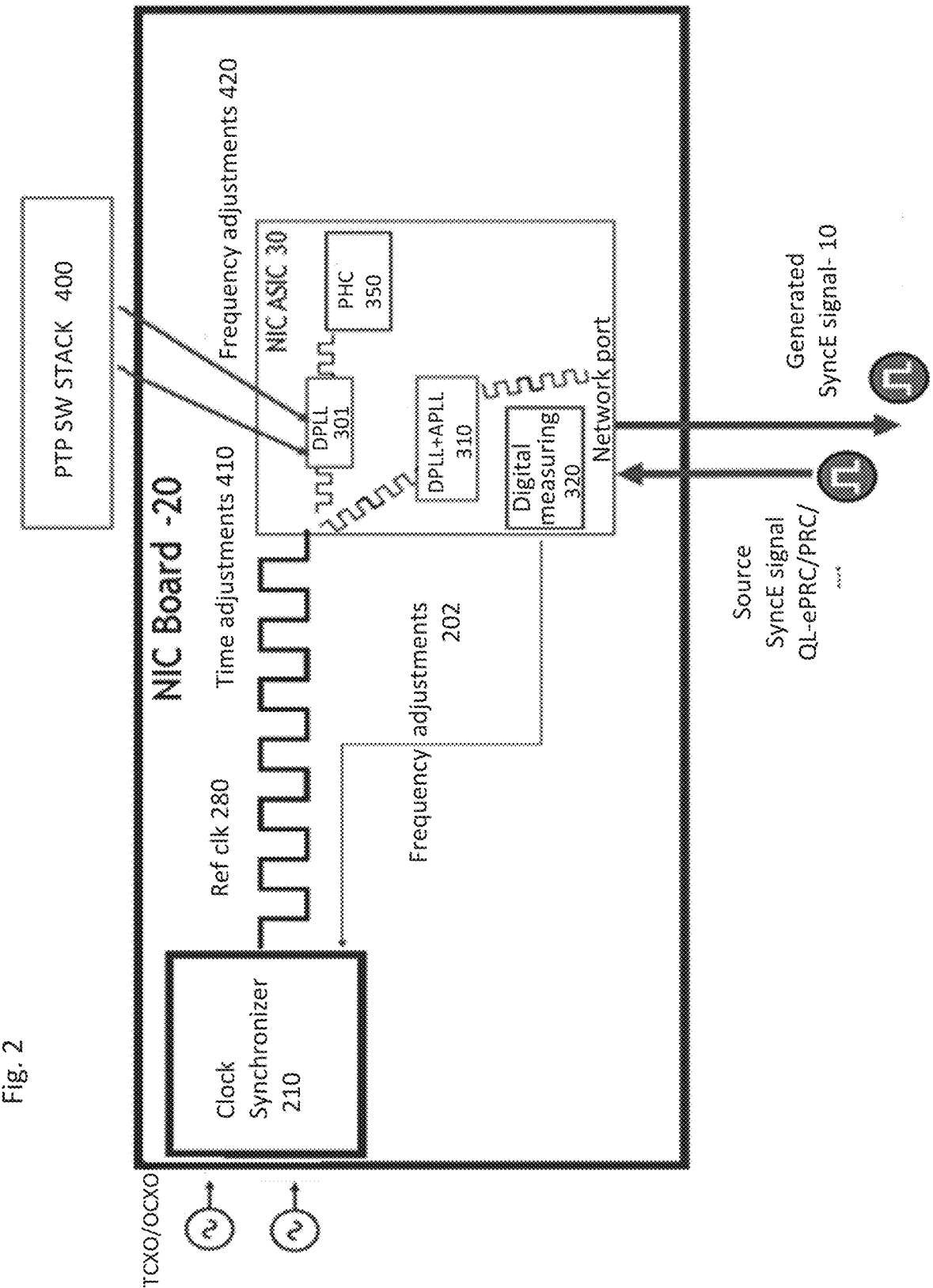
FIG. 2 is a SyncE system level diagram.

FIG. 2 is a SyncE System level diagram. As shown, the NIC is connected to a PRC (Primary Reference Clock e.g., as defined in ITU-T G.811 or SyncE high quality SRC clock via the network ports; it is appreciated that clock quality level may be as defined as in ITU-G.781. Digital logic 320 measures the wander difference between the transmission symbol rate to the rate symbols which are being received from the SyncE SRC link. The wander difference is "translated" into frequency adjustment commands 202 to the external component on clock synchronizer board 210. This board 210 can do fine-tuning of the reference clock 280. Changes in the reference clock are typically translated into changes in the TX symbol rate, e.g., by the APLL+DPLL 310. The Digital measurement 320 then closes the control loop with the sync wander. The Reference Clock typically adjusts the frequency of the PHC 350 and brings the PHC's frequency close to the nominal, assuming that the SRC clock in the sync is better than the local device's oscillator (aka the "local oscillator"), e.g., assuming that the local device's link partner's oscillator's quality is better than the quality of the local oscillator.

Responsively, the PTP SW need not send frequency adjustments 420 to the DPLL 301 of the PHC 350; the PTP SW may, instead, send only time adjustments 410. This yields a generated SyncE signal (10) for the next in line network nodes and/or a more accurate PHC, whose frequency has been stabilized.

Example systems performing at least some of the above operations are presented in U.S. Pat. No. 10,778,406 to Gaist et al.

It is appreciated that HW board modifications may be needed, specifically deploying the clock synchronizer 210 on the board between the XO (e.g., crystal oscillator) and the NIC, which may double the product's SKUs (stock keeping units) of the product and may prevent applicability to existing deployments where a board with clock synchronizer 210 is not present.

Figure 3:
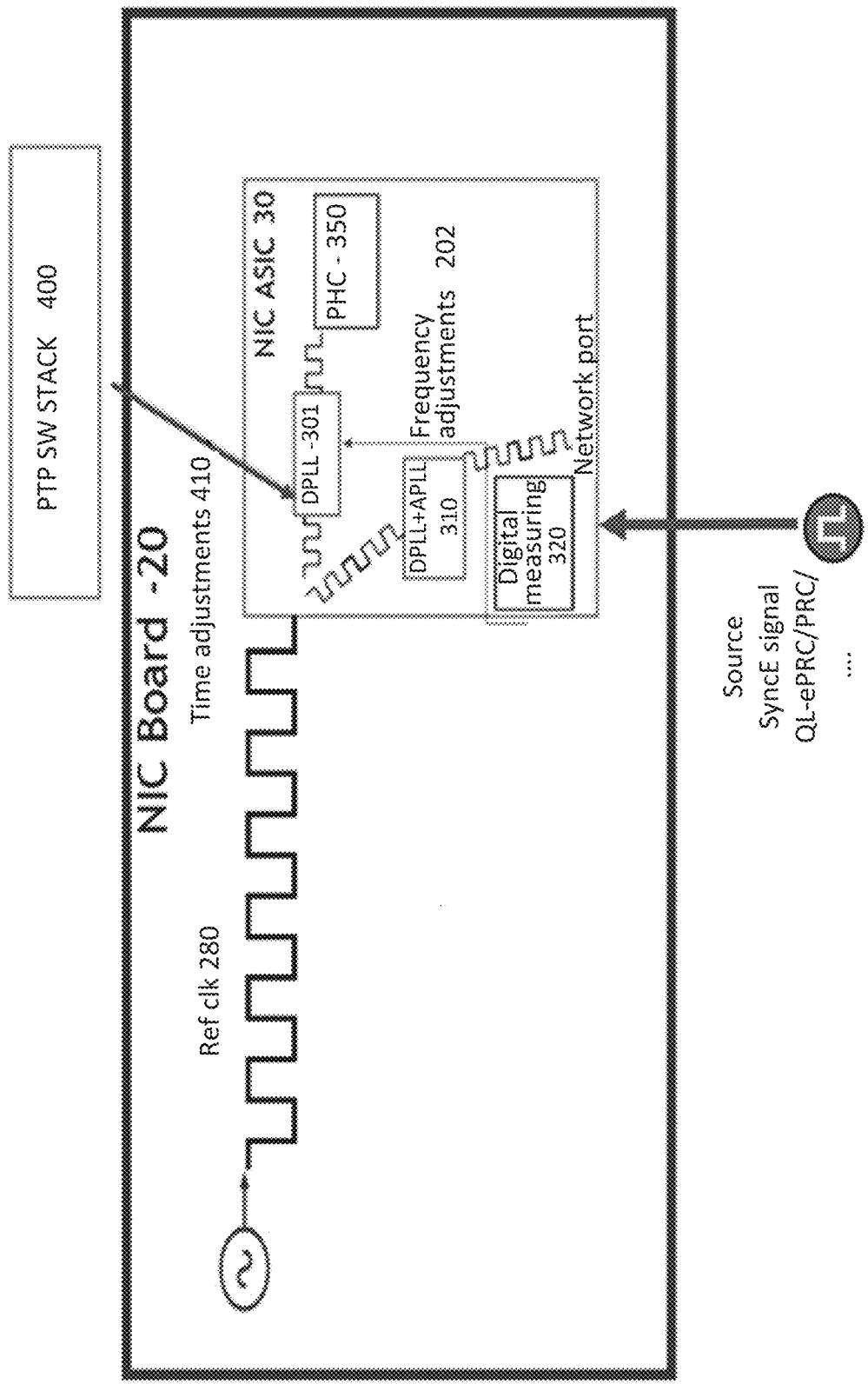
FIG. 3 illustrates an embodiment which is applicable to existing or legacy HW, without any board modification which involves deploying a custom clock synchronizer on the board.

FIG. 3 illustrates an embodiment which is applicable to existing or legacy HW, without any board modification which involves deploying a custom clock synchronizer on the board. In this embodiment, when generating a SyncE signal is not a requirement, the system takes advantage of the fact that a stable in frequency signal (e.g., SyncE signal) is arriving, and may (e.g., if the incoming source SyncE signal, represented in FIG. 3 by a south-to-north arrow, is noisy) use filtering and/or measurements (e.g., by way of non-limiting example, either linear or non-linear filtering, such as but not limited to average (mean) and/or median and/or low-pass and/or band-pass filtering) to discipline, if and as needed, the local DPLL, which, in turn, controls the local PHC. This yields a more stable PHC clock, such that the PTP software stack (daemon e.g.,) need not be burdened with performing frequency adjustments.

The filter can be implemented as part of the FW logic (e.g., the "FW controller" block of FIG. 4), or may use dedicated HW, if such exists. Common filters which can be used are average filter, median filter, low-pass filter, band-pass filter.

In the embodiment of FIG. 3, the frequency adjustments 202 are sent from the digital measuring circuitry 320 to the DPLL 301, whereas in the embodiment of FIG. 2 the frequency adjustments are sent to clock synchronizer 210. The operations of digital measuring circuitry 320, e.g., in FIGS. 2 and 3, relieve the PTP software stack (daemon e.g.,) of the burden of performing frequency adjustments.

FIG. 4 is an example implementation of the embodiment of FIG. 1 which typically includes a packet time-stamping path, through the PHC. It is appreciated that the PTP daemon may comprise a PTP SW stack, the performance counter may be in the network port or in the physical layer, and the SW interface of FIG. 4 may include a reference Time Source Selection algorithm e.g., as described herein, thereby to control the internal controller which adjusts the frequency of the PHC's DPLL.

In FIG. 4, the frequency diff (typically, the difference between (a) the clock frequency of a PHC whose network element is configured to use an embodiment of the present invention and the RX symbol rate received from the link partner; or (b) the TX symbol rate of the network element configured to use an embodiment of the present invention and the RX symbol rate received from the link partner), is measured, e.g., by digital measuring circuitry 320 of FIGS. 2, 3. Alternatively, a standard other than the clock frequency of the link partner, may be used to measure the clock frequency of the PHC whose network device is configured to use an embodiment of the present invention, thereby to determine whether the clock frequency f of the PHC whose network device is configured to use an embodiment of the present invention, is the same as the standard, or higher than the standard, in which case f may be reduced to the standard, or lower, in which case f may be increased to the standard. Accordingly, the PHC DPLL of FIG. 4 (which may be identical to the DPLL 301 in FIGS. 2, 3) is typically updated. It is appreciated that the digital PLL (DPLL)'s configuration determines the frequency of the PHC, which in turn is derived from the core clock. Typically, the PHC frequency is the core clock frequency multiplied by a factor (scalar) extracted from the DPLL's current configuration. The Time Source Selection SW typically knows to activate the firmware/hardware controller implementing the frequency adjustment e.g., because the Time Source Selection SW at a given network device may receive packets with data on link-partners' clock quality level; this data may indicate whether partners' clocks' accuracies are high or low, e.g., relative to one another and/or relative to the given network device's clock. The Time Source Selection SW may, alternatively or in addition, query the given network device for the local clock quality level. If there is/are link partner/s with better (e.g., higher accuracy) clock quality, the given network device typically locks to one of those link partner/s, typically to the best available partner (the partner with the most accurate clock) and/or starts using that frequency (e.g., using "set status") It is appreciated that FIG. 4 illustrates a HW/FW embodiment which uses an open loop approach. As shown, a frequency difference e.g., between the RX symbol rate and TX symbol rate or between the PHC frequency and TX symbol rate) is periodically measured by the network device's FW, and the PHC's DPLL is updated accordingly. For example, all or any subsets of the following operations may be performed (e.g., by the firmware controller of FIG. 4), in any suitable order e.g., as follows:

Operation a: Set up or provide measurement HW for new frequency diff periodic measurement (e.g., reset the physical layer's performance counter).

Operation b: Start measurement and wait a period of a pre-defined window.

Operation c: After time has passed, collect data regarding RX and TX symbol during measurement window, and calculate frequency differences (e.g., 10.235 PPB).

Operation d: Update PHC DPLL according to the measured PPB diff.

Operation e: Repeat the process at least once e.g., periodically e.g., continuously, by returning to operation a above. The embodiment of FIG. 4 may co-exist with an active PTP (which provides PTP daemon frequency updates). A DPLL implementation for converting the core clock to PHC may have numerator and denominator parameters, which may determine the current frequency. One of those parameters, e.g., the numerator, may be allocated to the PTP daemon frequency updates, and the other parameter may be allocated to implementing the embodiment of FIG. 4. This would reduce accumulated drift between PTP consecutive updates.

Alternatively, a closed-loop approach may be used, in which a control mechanism keeps accumulated RX symbols and PHC time in sync.

In the open loop approach, no feedback is typically generated regarding the adjustment of the PHC's frequency, between RX and TX (or between the RX rate and TX rate). In contrast, in the closed loop approach, rather than (or in addition to) measuring TX (or the TX rate), the PHC is typically measured directly; this yields feedback regarding adjustment of the PHC's frequency. Typically, the "closed loop" implementation has a sense of the time that has passed on the local PHC, starting from the initial time the local PHC locked on the current link partner. According to one possible embodiment, a PD (proportional derivative) controller may be provided in which case, the loop on the local device may then try to run at the same speed as the link partner, but also tries to pass the same distance, where distance is proportional to time (e.g., time*constant1). At any given link speed, distance may be computed as number of bits*constant2=number of "symbols"*constant3. the time/bits/symbols that passed on the link partner may be extracted or determined or estimated, e.g., by accumulating bits/"symbols" on the RX side, and trying to "track" this value on the TX/local side.

For example, RX symbols may be translated to time, yielding an output scalar, which may be compared to the time that has elapsed on the PHC. Suitable parameter/s (such as, by way of non-limiting example, (1) RX symbols translated to time; and/or (2) the time that has elapsed on the PHC and/or (3) whether or not to filter, to discipline the local DPLL, and/or if so, which filter to use) may be added to the HW/FW controller (e.g., provided as input to the controller) to ensure that the controller's operation takes these parameter/s into account. It is appreciated that PID (proportional-integral-derivative) controllers are a suitable type of programmable controllers which can use such parameters for their internal logic/calculations. By way of non-limiting example, PI (proportional integral) and PD (proportional derivative) controllers would be suitable to maintain a closed control loop e.g., as described herein.

According to certain embodiments, the RX-symbol rate is measured or extracted inside the physical layer of the network port e.g., by "perf count/s" (performance counters in the network device e.g., NIC, where performance counters refer generally to code that, in software, monitors and/or counts and/or measures events—such as receipt of symbols by the network device, which were sent by a link partner of the network device).

Typically, in the embodiment of FIG. 4, there are time adjustments only in the PTP; these are typically provided by the PTP daemon to the PHC. There are typically frequency adjustments provided by the FW controller to the PHC DPLL e.g., as per any embodiment described herein. In normal behavior, or conventionally, the PTP daemon also sends (typically small) frequency adjustments. In contrast, in the embodiment of FIG. 4, these frequency adjustments from the PTP daemon are no longer necessary.

Figure 5:
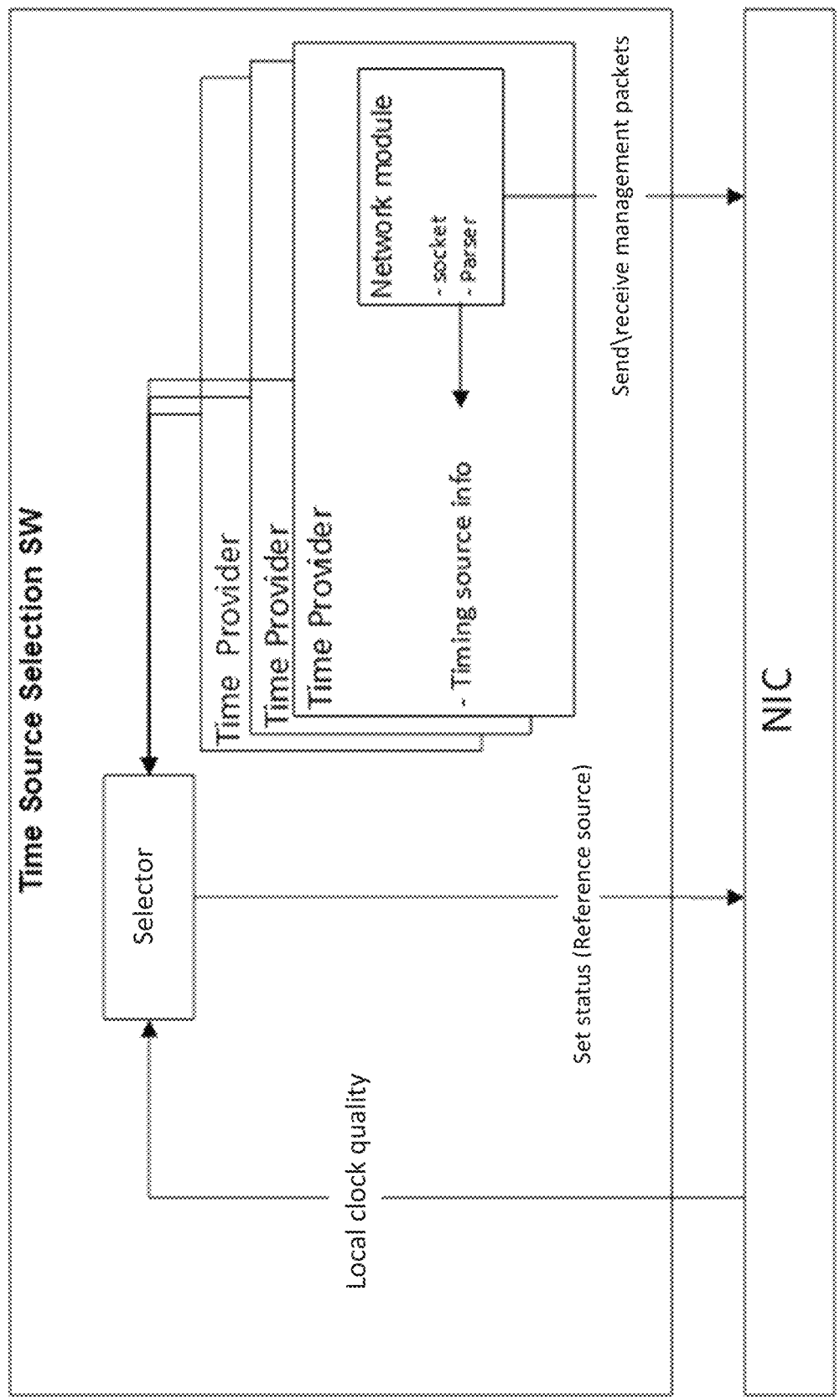
FIG. 5 is a simplified block diagram illustration of Time Source Selection functionality constructed and operative in accordance with an embodiment, which selects a network port having an RX symbol rate known to a partner, from among plural network ports having an RX symbol rate known to the partner, from which the partner will extract the network peer oscillator frequency.

Any of the illustrated embodiments may include Time Source Selection software which serves as a software interface to the controller, as exemplified in FIG. 4, in which a "software interface" block is indeed shown. Time Source Selection SW block typically selects a network port having an RX symbol rate known to a partner, from among plural network ports having an RX symbol rate known to the partner, from which the partner may extract the network peer oscillator frequency. An example implementation of this Time Source Selection block is shown in FIG. 5, interfacing with a "NIC" such as the NIC of FIG. 4, or any other appropriate network device. The "Set status (Reference source)" and "Local clock quality" arrows of FIG. 5 are, for simplicity, represented as a single arrow in FIG. 4, since both are directed to the network device, typically to the FW. The "send/receive management packets" arrow may be directed to the network port and the network link, typically using the device's network stack, as is conventional.

If, for example, the SW of FIG. 5 selects a certain port x, the relevant partner typically remains locked onto port x until the SW decides otherwise (decides to change the port), e.g., because a message is received through port y which indicates higher QL, in which case there may be a decision to start following port y, or perhaps because a change in the quality level (aka QL) of port x may result in port x's quality level being lower than the local QL, in which case there may be a decision to go to Holdover.

More generally, FIG. 5 illustrates a SW implemented architecture which may be provided stand-alone or as an example implementation for the time source selection functionality shown and described herein. The architecture of FIG. 5 typically includes Time Provider/s e.g., at least one SW entity (typically plural such entities), associated with a port and selected to be the timing source, and a selector. Each such software entity may include a class or structure e.g., as is conventional in object oriented programming.

Each Time Provider (or "clock provider") typically comprises a network module configured to perform all or any subset of the following operations, suitably ordered e.g., as follows:

Operation a. Open a socket for management packets on the Time Provider's associated port. The management packets may, for example, be ESMC PDUs (Ethernet Synchronization Messaging Channel protocol data units) as defined on ITU-T G.8264, a specification document developed by the International Telegraph Union (ITU)'s Telecommunication Standardization Sector (ITU-T), which is available online e.g., at the following https www link: itu.int/rec/T-REC-G.8264, and specifies the Ethernet Synchronization Messaging Channel (ESMC). Or the management packets may comprise any packet that carries information regarding quality/ies of neighbors' clock/s.

Operation b. Send management packets to update neighbors regarding quality of the local clock.

Operation c. Parse received management packets to extract the timing source information therefrom. Upon timing source information change (the timing source identified in the received and parsed packets differs from the current timing source), the network module initiates the selector to determine whether or not the reference timing source (the source of the signal to be followed) should be changed, and a new reference, or master, selected instead.

The selector may comprise a selection algorithm running on a hardware processor, for selecting the best timing source from among the set of available timing sources e.g., the Local Clock and any Time Provider. The selection algorithm typically compares the quality (and possibly other relevant features such as manually configurable priority) of plural timing sources, e.g., all timing sources, in the set of timing sources available to (e.g., in communication with or linked to) the local device. The selection algorithm output typically comprises a status and reference timing source that the HW block of FIG. 5, which represents the network device e.g., NIC or DPU or switch, should track (e.g., should use as a timing source according to which the PHC's frequency is adjusted). The term "status" as used herein is intended to include a Tracking or Holdover or Free running reference timing source, or a clock which is being tracked (for example, say, the clock behind the link of port 1).

Figure 6:
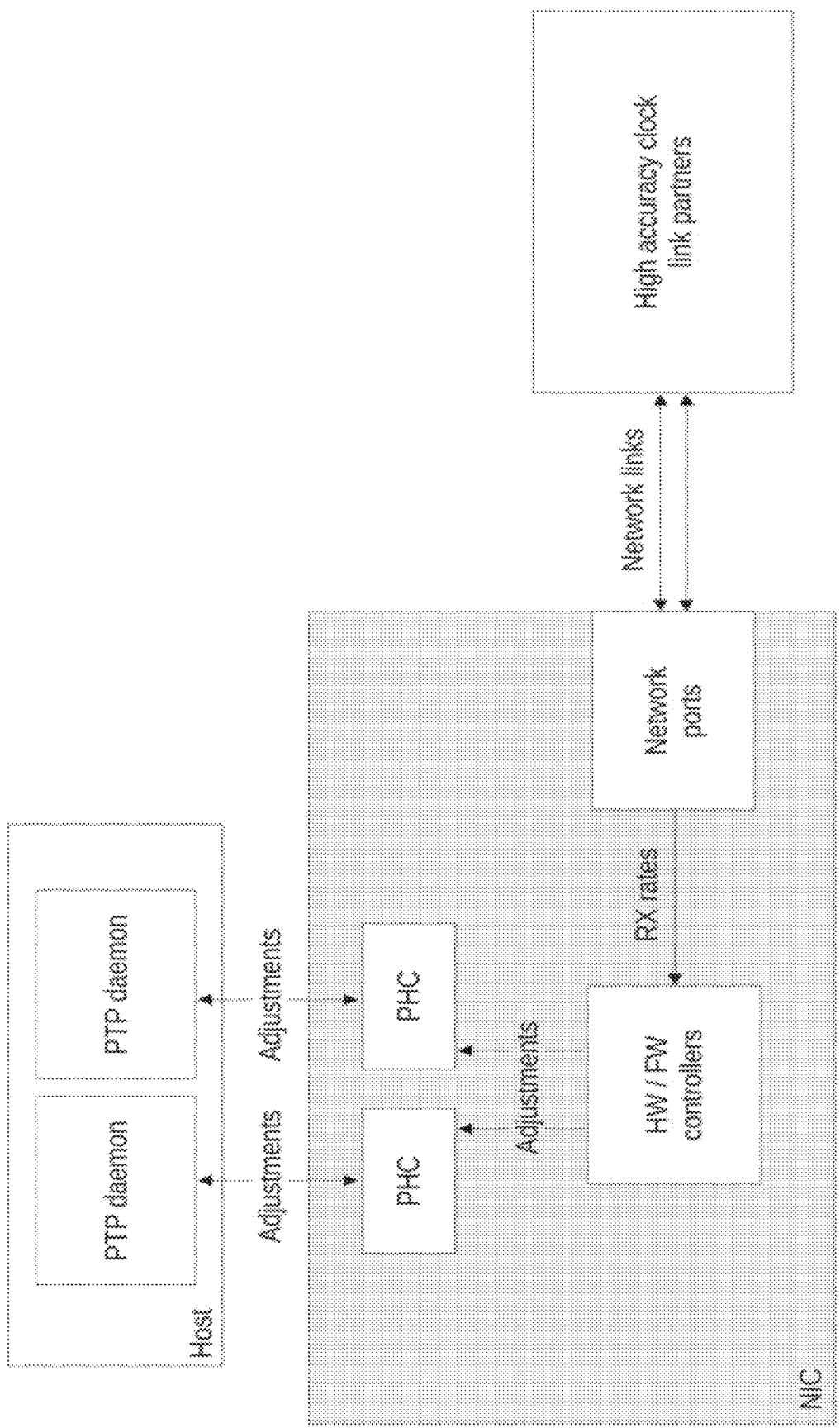
FIG. 6 illustrates a system which serves plural PHCs.

It is appreciated that if a network device has plural PHCs, the system herein may serve only one of them, or some, or all. For example, FIG. 6 illustrates a system which serves plural PHCs (2, by way of example) instead of serving just one PHC as is shown, by way of example, in FIG. 1.

Figure 8:
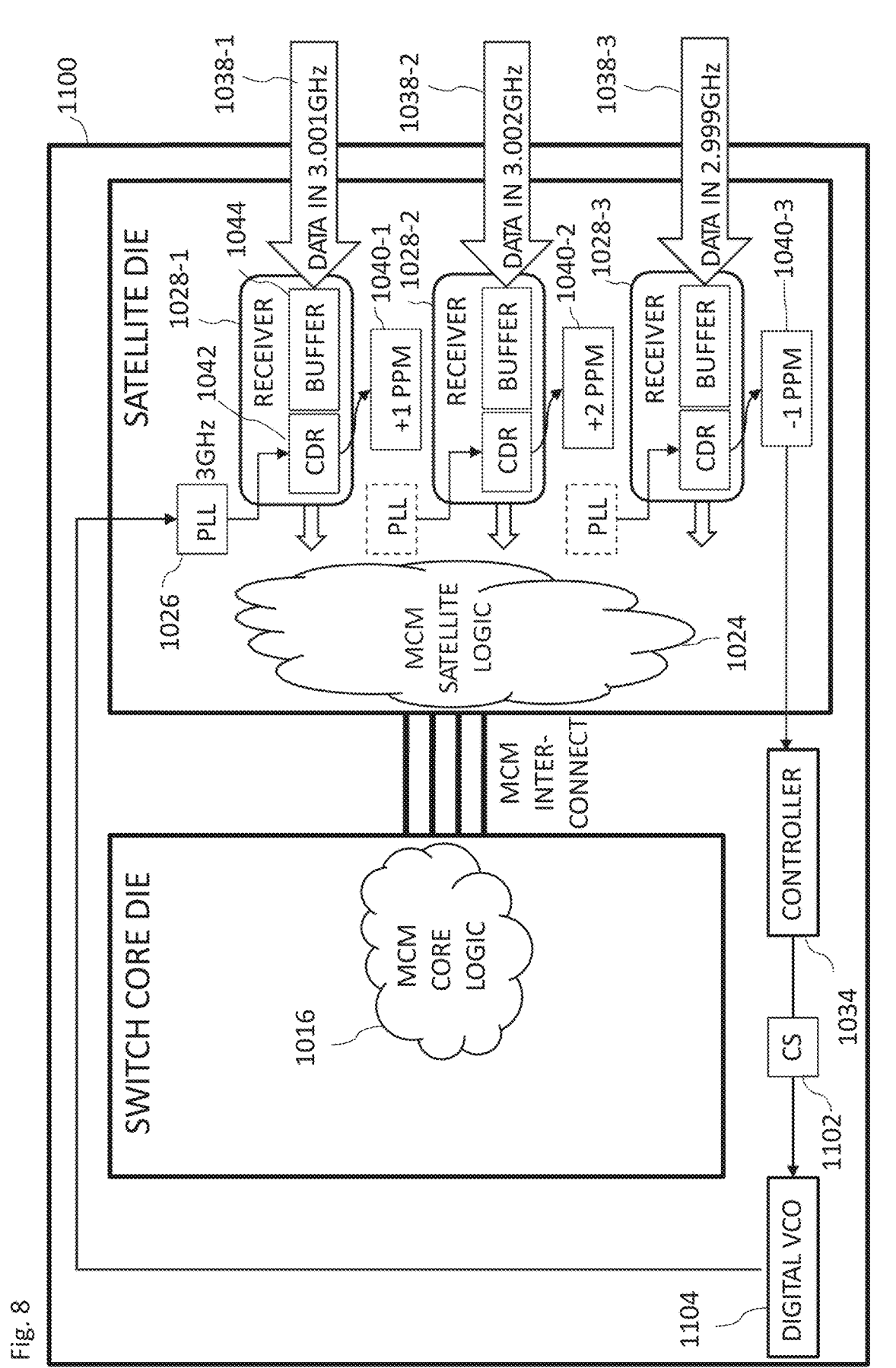
FIG. 8 is a schematic block diagram view of a network device constructed and operative in accordance with an embodiment of the present invention.

Reference is now made to FIG. 8, which is a schematic block diagram view of a network device 1100 constructed and operative in accordance with an embodiment of the present invention. The network device 1100 comprises frequency generation circuitry including a voltage-controlled oscillator 1104 which, under control of a controller 1034 (which may comprise the controller 34 of FIG. 1) and using a control signal 1102, generates the clock signal. Prior to the master clock or reference clock being designated by the network management function, the controller 1034 is configured to control the voltage-controlled oscillator 1104 to generate a clock signal with any suitable frequency, e.g., 156 MHz. Once the master clock has been designated by the network management function, the controller 1034 is configured to adjust the clock signal generated by the voltage-controlled oscillator 1104 using the control signal 1102 based on RX symbol rate-TX symbol rate, or the clock differential 1040 between the recovered remote clock (designated as the master clock) and the local clock generated by the PLL 1026.

The network device 1100 includes a switch core die 1012 and a satellite die 1014. The switch core die 1012 includes multi-chip module (MCM) core logic 1016 and switching circuitry to perform switching functions. The satellite die 1014 includes MCM satellite logic 1024 to perform receiving and transmission functions of the switch. The satellite die 1014 may also include a PLL 1026 and a plurality of receivers 1028 and connections to a plurality of ports (not shown). The receivers 1028 have been labelled individually as 1028-1, 1028-2 and 1028-3 for the sake of simplified reference. The switch core die 1012 and the satellite die 1014 are generally connected using an MCM interconnect 1030.

Although the network device 1010 has been described with reference to a multi-die network switch, embodiments of the present invention may be implemented on any suitable network switch, including one or more dies, or any suitable network device, for example, but not limited to, a network router with one or more dies.

The receivers 1028 are configured to receive and buffer (in a buffer 1044) respective data streams 1038 (labeled 1038-1 to 1038-3) from respective remote clock sources (not shown). For the sake of simplicity only, one of the buffers 1044 has been labeled with the reference numeral 1044. Each receiver 1028 may be implemented using any suitable hardware such as a Serializer/Deserializer (SerDes), for example, but not limited to, an LR SerDes RX. The data in the data streams 1038 generally arrives from the remote clock sources without a clock value. Each receiver 1028 may include a clock and data recovery (CDR) process 1042 running therein to recover a remote clock from its received data stream (or RX symbol rate) 1038, for example based on transitions in the data of the received data stream 1038. For the sake of simplicity, only one of clock and data recovery (CDR) process 1042 has been labeled with the reference numeral 1042. The CDR of each receiver 1028 may also compute a clock differential 1040 (labeled 1040-1 to 1040-3), which is a difference between its recovered remote clock and the local clock (generated by the PLL 1026) (e.g., the recovered remote clock less the local clock) of the network device 1010, so that for each received data stream 1038, a difference between the recovered remote clock of the data stream 1038 and the local clock is computed. The clock differential 1040 is stored in a register of the network device 1100. In some embodiments, each clock differential 40 is stored in a register of the receiver 1028 that computed that clock differential 1040. The clock recovery may be implemented based on any suitable process, including a non-CDR based process, for example, but not limited to, using a delay-locked loop and oversampling of the data stream. The data streams 1038, apart from their use in recovery of the remote clocks, generally include data for forwarding to other devices in the network. Therefore, the data streams 1038 are generally forwarded via the MCM interconnect 1030 to the multi-chip module core logic 1016 to perform various switching functions (or routing functions when the network device 1010 is implemented as a router). The recovered clocks and the clock differentials 1040 are generally not forwarded to the multi-chip module core logic 1016 via the MCM interconnect 1030.

The example of FIG. 8 shows three receivers 28. The number of receivers 1028 may be any suitable number of receivers, and is not limited to three. The example of FIG. 1 shows three boxes for the PLL 1026, one with a solid-line box and two with a dotted-line box. The three boxes represent the same PLL 1026, which has been duplicated twice for the sake of clarity.

FIG. 8 shows that data stream 1038-1 received by the receiver 1028-1 has a recovered clock of 3.001 GHz. Therefore, the clock differential 1040-1 between the recovered clock of the received data stream 1038-1 of 3.001 GHz and the local clock of 3 GHz is +333PPM (e.g., the master clock is faster than the local clock by 333PPM). The data stream 1038-2 received by the receiver 1028-2 has a recovered clock of 3.002 GHz. Therefore, the clock differential 1040-2 between the recovered clock of the received data stream 1038-2 of 3.002 GHz and the local clock of 3 GHz is +666PPM (e.g., the master clock is faster than the local clock by 666PPM). The data stream 1038-3 received by the receiver 1028-3 has a recovered clock of 2.999 GHz. Therefore, the clock differential 1040-3 between the recovered clock of the received data stream 1038-3 of 2.999 GHz and the local clock of 3 GHz is −333PPM (e.g., the master clock is slower than the local clock by 333PPM).

It is appreciated that the embodiments herein improve the SyncE standard by doing only a subset of what the SyncE standard demands (e.g., not generating a SyncE signal in the output signal, and, optionally, not using and/or extracting the clock as accurately as defined in the SyncE standard), but providing a much more stable frequency clock for a network device (and/or other value absent from SyncE), e.g., by using the extracted data from the symbol rate for adjustments to the PHC, without adding hardware requirements (to the contrary, embodiments described herein have fewer hardware aka HW requirements, relative to SyncE).

Figure 10:
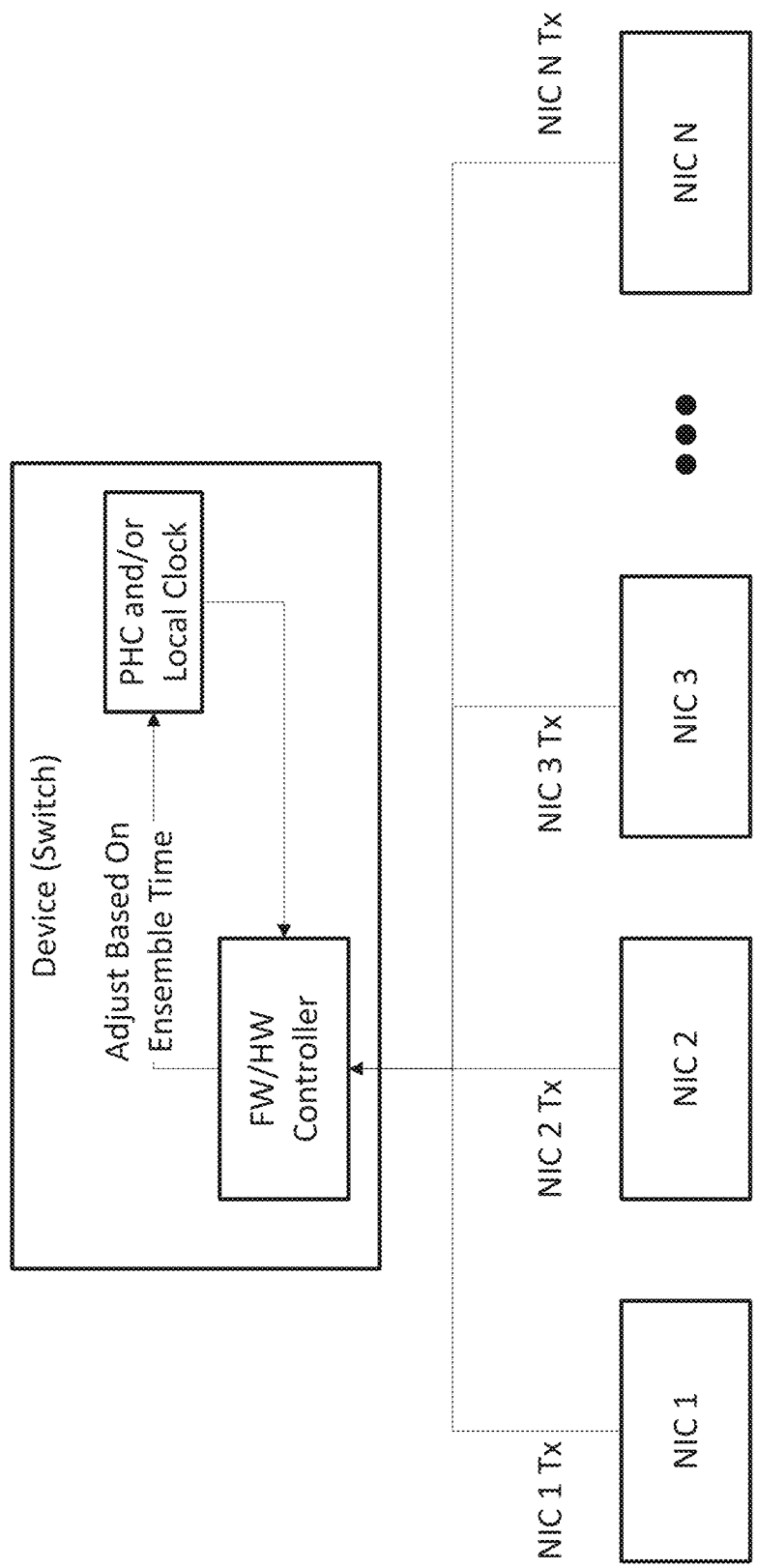
FIG. 10 is a block diagram depicting an architecture for constructing an ensemble time and for using an ensemble time to adjust a PHC and/or local clock.

FIG. 10 illustrates a system in which an ensemble time is calculated and then used to adjust one or both of a PHC and a local clock. In this example, the device, such as a switch, may include a FW/HW controller that receives data from a plurality of NICs. Each NIC (e.g., NIC1, NIC2, NIC3, ..., NICN) may have a unique transmission symbol rate (e.g., NIC1 Tx, NIC2 Tx, NIC3 Tx, ..., NICN Tx). The symbol rate for each NIC may be measured at the device's FW/HW controller.

In some embodiments, the FW/HW controller may measure the frequency of all peers (e.g., of each NIC) by measuring each NIC's Tx symbol rate. The frequency measured for each NIC may be used to calculate an ensemble time. Said another way, given two or more peer frequencies, the FW/HW controller may calculate or determine an ensemble time. In some embodiments, an ensemble time may correspond to a weighted average of each frequency measured for each NIC. The ensemble time may correspond to a weighted average of each frequency that is weighted based on a NIC's crystal oscillator's QL and/or based on a NIC's crystal oscillator's past performance.

The FW/HW controller may then utilize the ensemble time as part of determining an adjustment to make to the local clock and/or a PHC. As one example, the FW/HW controller may determine a difference between the local clock and the ensemble time. The difference between the local clock and ensemble time may be determine the difference in parts per million and/or per billion and/or per trillion (e.g., PPM/PPB/PPT). The PPM differences may then, for example, be used to adjust the frequency of the local clock and/or the PHC of the device. In some embodiments, changes to the device's local clock may be used to create other clock adjustments to peers connected with the device. In other words, an adjustment made to the local clock of the device may propagate to other clock changes in the network. In some embodiments, two or more of the peer devices (e.g., the NICs) may have a similar or identical type of crystal oscillator. Utilization of an ensemble time may help to achieve a low-cost and stable-in-frequency device.

As described above, the ensemble time may be determined based on frequencies measured by two or more peers (e.g., a Tx symbol rate of two or more NICs). In some embodiments, the FW/HW controller may also be configured to identify one or more measured frequencies as being an outlier frequency and selectively determine not to include that measured frequency in the set of measured frequencies used to calculate ensemble time. Said another way, the FW/HW controller may be configured to identify when one or more Tx symbol rates corresponding to an outlier Tx symbol rate. The outlier may then be excluded from consideration as part of the ensemble time. The capability to identify outlier frequencies may enable the FW/HW controller to detect and handle faulty clocks as part of determining ensemble time. In this way, the ensemble time may be determined using clocks of different peers that are operating properly.

In some embodiments, the approach of using ensemble time as depicted and described in connection with FIG. 10 may be combined with other approaches depicted and described herein. For instance, a FW/HW controller may be configured to create a full solution for cluster syntonization using a local clock that has been updated based on a calculated ensemble time. In some embodiments, the device (switch) may have its local clock connected to PHCs of one or more NICs (e.g., NIC1, NIC2, NIC3, . . . , NICN). The PHC of the one or more NICs may be configured to follow the local clock of the device (switch) that is being adjusted based on an ensemble time calculated at the FW/HW controller of the device using the frequencies measured by the NICs. In other words, the device (switch) may be configured to use the symbol rate of multiple NICs to create a time ensemble and then adjust its Tx symbol rate accordingly. Then all NIC PHCs will follow the local clock of the device (switch) thereby providing each NIC with the time ensemble quality frequency. As long as the NICs receive the appropriate clock signal from the device (switch), then the PHC drift will be sufficiently managed and minimized.

Figure 11:
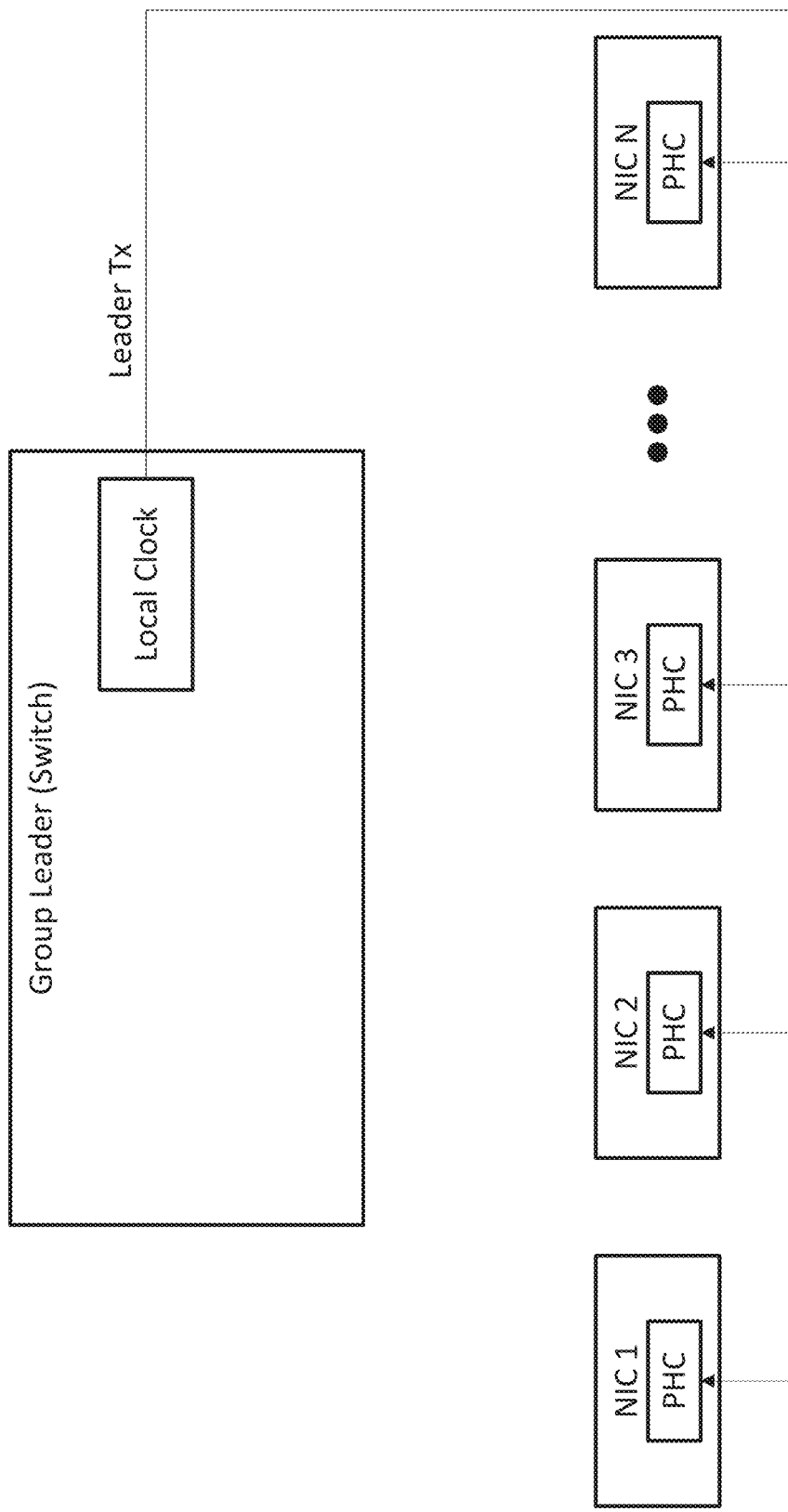
FIG. 11 is a block diagram depicting an architecture for supporting synchronization of a cluster of network elements.

FIG. 11 illustrates a further configuration of the system where one or more network elements (e.g., NIC1, NIC2, NIC3, . . . , NICN, etc.) have their PHC syntonized or following the local clock of a group leader. It is known that in transferring frequency information, using a fast (higher frequency) signal is better than transferring frequency information using a slow signal. High speed networking components are at the leading edge of the high speed frequency technology, which makes sharing frequency information among such components all the more challenging. In the depicted embodiment, the group leader is illustrated as a switch and is shown to provide a Leader TX signal to other network elements, which allows those network elements to adjust their PHCs based on the current state of the local clock in the group leader.

In some embodiments, it may be useful to provide relative syntonization (e.g., syntonization between nodes/network elements and not to an absolute reference frequency) in a flat system. FIG. 11 illustrates one example of a system in which nodes/network elements are connected to a switch and are configured to have their PHCs follow the local clock of the switch. In some embodiments, each network element (e.g., NIC) has its own PHC that is adjustable based, at least in part, on the physical layer frequency information that is driving the local clock of the switch. Said another way, more than one network element in the system is configured to discipline it's corresponding PHC using the physical layer frequency information as determined at the switch. For example, as discussed above, the physical layer frequency information may be extracted from an RX symbol rate at the group leader, which results in an adjustment to the local clock of the group leader.

It should be appreciated that the group leader does not necessarily need to correspond to a switch and there may be more than one subnetwork within a system. Furthermore, the network elements may correspond to any number of devices or device types and may be provided in a number of different networks or systems. For instance, the network elements may correspond to cellular network elements (e.g., antennas, routers, mobile substations, a distributed antenna system (DAS), etc.), data center network elements (e.g., a Top-of-Rack (ToR) switch, NICs, routers, servers, switches, network adapters, etc.), combinations thereof, and the like.

In some embodiments, a cell may be provided with a number of cellular network elements (e.g., antennas) whose clocks/PHCs are synchronized relative to one another. If the cell is small (e.g., a micro cell), then the cell may contain a single switch (e.g., at most one network switch). If the cell contains at most one network switch, solutions provided by the present disclosure allow a frequency alignment in all network elements (e.g., compute nodes) of the cell by adjusting each compute note to the switch symbol rate. In some embodiments, the frequency alignment may be achieved with a linear multiplication of the switch's internal PLL.

In some embodiments, the proposed solution may be deployed in an already-existing cell deployment. The cell deployment does not necessarily need to natively support SyncE, which is the standard for frequency transfer over Ethernet. As will be discussed in further detail herein, the cell or subnetwork whose network elements are being synchronized relative to one another does not necessarily have to contain a switch as a group leader. Another use case may include a deployment that enables frequency transfer in data center where SyncE supported switches do not exist.

Figure 12:
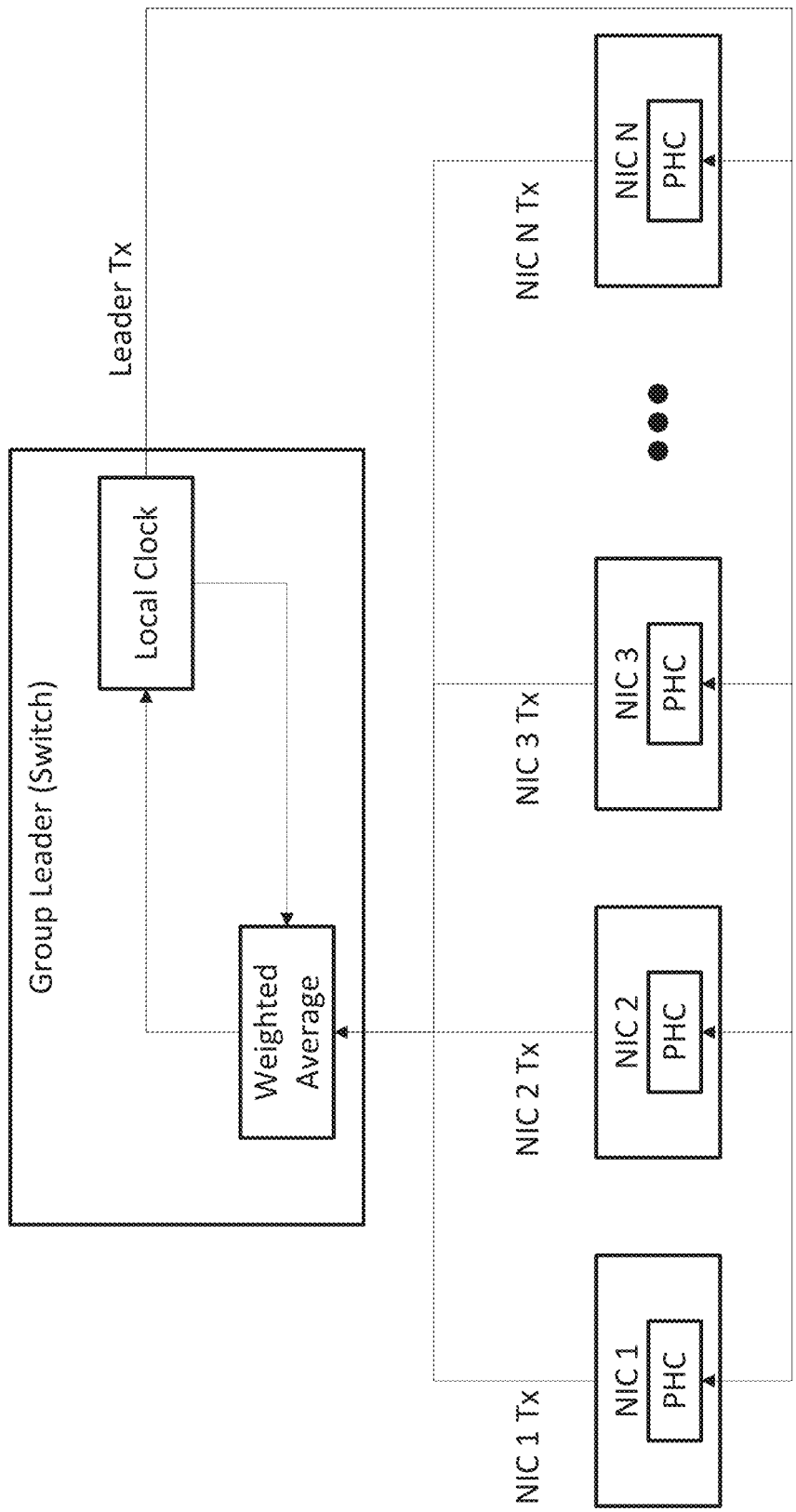
FIG. 12 is a block diagram depicting an architecture for supporting synchronization of a cluster of network elements using an ensemble time.

FIG. 12 illustrates another example of the system where an ensemble time is used to adjust the local clock of the group leader, then the local clock (that has been updated according to an ensemble time) is used to drive adjustments to PHCs of the network elements (e.g., NIC1, NIC2, NIC3, . . . , NICN). FIG. 12 represents a combination of the system depicted in FIG. 10 and the system depicted in FIG. 11. In this particular configuration, the switch may be considered part of the cell or subnetwork that has clocks being synchronized based on the common physical layer frequency information (e.g., as determined by the ensemble time).

The ensemble time used to adjust the local clock of the group leader may be based on at least a first RX symbol rate received from at least a first network element and may further be based on at least a second RX symbol rate received from at least a second network element. The ensemble time may be used to adjust the local clock of the group leader, which subsequently drives the Leader TX and results in further changes to the PHCs of the network elements in the subnetwork including the switch.

Figure 13:
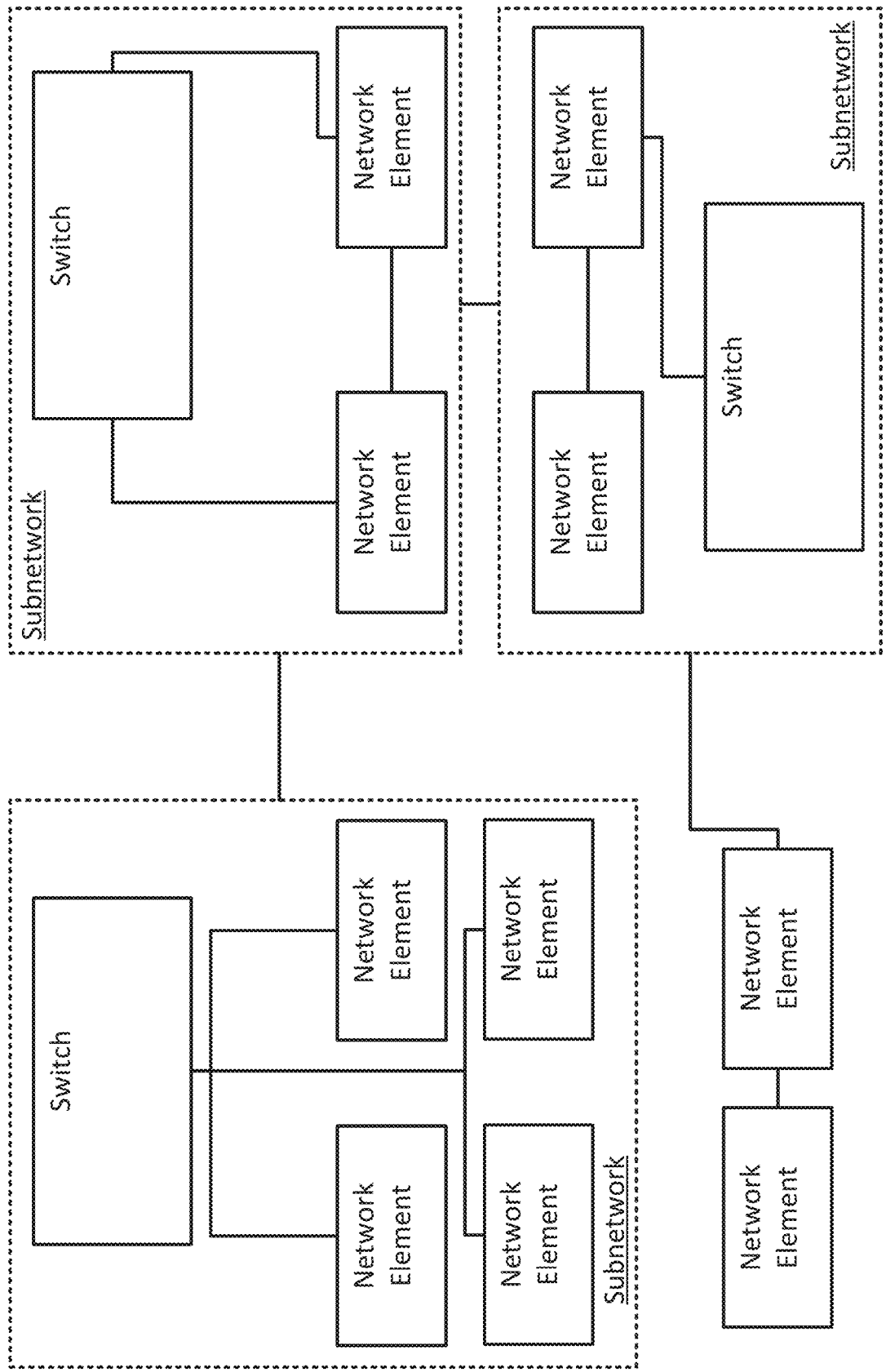
FIG. 13 is a block diagram depicting a plurality of subnetworks that make up a larger system or network.

As can be seen in FIG. 13, the configuration of a subnetwork may vary. For instance, network elements of a subnetwork may be connected in a back-to-back configuration, a ring configuration, or any other configuration. Regardless of the configuration used, the PHCs of the network elements in a subnetwork may synchronize with one another according to physical layer frequency information. In some embodiments, the physical layer frequency information may be received from a switch or group leader within a particular subnetwork. In some embodiments, the physical layer frequency information may be received at two or more network elements from a switch or group leader that is external to their subnetwork. The various subnetworks may be connected to one another, but do not necessarily need to synchronize with one another as described herein. For instance, other synchronization techniques may be used to synchronize different subnetworks, while the network elements within a particular subnetwork are further synchronized or share frequency information within the subnetwork.

Figure 14:
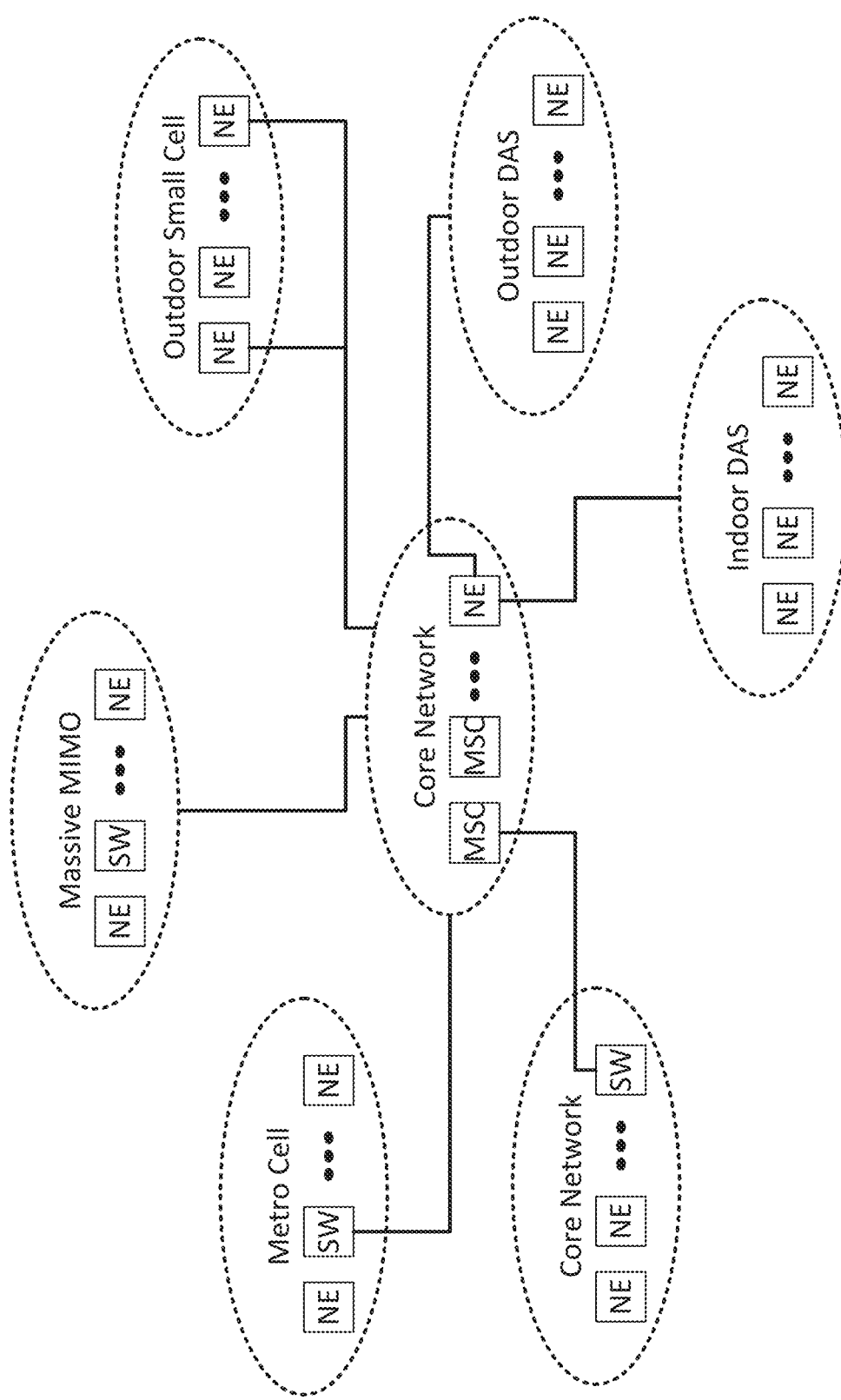
FIG. 14 is a block diagram depicting an illustrative cellular network, which may include a number of subnetworks that support synchronization between network elements thereof.

FIG. 14 illustrates another system configuration in which the various subnetwork correspond to cellular subnetworks and the network elements within the cellular subnetworks maintain a relative synchronization. Examples of the network elements may include, without limitation, the network elements (NE) described herein, switches (SW), mobile switching centers (MSC), etc. As can be appreciated, each subnetwork of the cellular network may include a core network, a metro cell, a massive MIMO, an outdoor small cell, an outdoor DAS, an indoor DAS, or the like. In other words, any collection of cellular network elements may be included in a subnetwork as described herein and may have their PHCs synchronized relative to one another as described herein.

For example, if an Nvidia network device e.g., NIC without SyncE support is used in a SyncE network, embodiments herein would provide the NIC's PHC with a far more stable frequency clock.

It is appreciated that frequency adjustment may be either absolute or relative. For example, consider the controller of FIG. 1 which may be implemented in firmware and may use the SyncE protocol. The FW may gather frequency related data from the HW and may compute, say, parts per million and/or per billion and/or per trillion (aka PPM/PPB/PPT) differences between RX and TX rates, to be used as a frequency diff value. For example, 1 PPB means 1 nano second of accumulated drift for each second, assuming one of the frequencies is perfect. A positive/negative number indicates which clock is faster/slower. Then the FW converts the frequency diff value, e.g., the PPB value, to a DPLL configuration related parameter (e.g., "TI BAW") of the external clock device. The internal configuration may be of the following type:

FREQ_OUT=FREQ_IN*(INT+NUMERATOR/DENOMINATOR)

Typically, everything, except the numerator, is kept constant, such that the internal configuration can be "solved", after which the relative PPB value is converted to a value to be added to/subtracted from the numerator to get the desired PPB. Alternatively, the PHC DPLL may be of type

FREQ_OUT=FREQ_IN *(NUMERATOR/DENOMINATOR)

which lacks the INT value of the DPLL configuration related parameter (clock synchronizer), in which case conversion from the relative PPM/PPB/PPT value to internal DPLL parameters changes accordingly.

PTP4L (an implementation of the Precision Time Protocol (PTP) according to IEEE standard 1588 for Linux which implements a Boundary Clock (BC) and an Ordinary Clock (OC)) uses absolute frequency updates and has a PPB value which is relative to 1 billion. This value is absolute, being relative to a constant. For example, is the value is +1 million=>the original frequency of the device (as derived from the core clock frequency of the device) is increased by (1 billion+1 million)/(1 billion)=1.001. If the same value is obtained again, the original frequency of the device is increased by the same value again, e.g., the action is the same as the action after the previous update. In contrast, in a relative update mode (or embodiment), 1 million PPB update received twice in a row will result in an increase of 1.001*1.001=1.002001 the second time, e.g., in a relative update mode (or embodiment), the action the second time is not the same as the action after the previous update.

SyncE is an Ethernet protocol, but applicability of embodiments herein is not limited to Ethernet and may be implemented in (typically packet-based) networks other than Ethernet (such as InfiniBand, PCIe, NVlink, etc.). SyncE, specifically, is a standard which requires frequency information to be provided by a selected network port from among plural network ports, and then, the partner of the selected network port does the following with that frequency information: a. distributes the clock provided by the selected port, to other network ports; and b. adjusts its (the partner's) own PHC. This causes accurate clocks to be disseminated through the network.

Any suitable protocol may be used by net elements according to embodiments of the invention, when communicating with a link partner to extract and use frequency as described herein. As described elsewhere, the management packets may for example be ESMC PDUs (Ethernet Synchronization Messaging Channel protocol data units) as defined on ITU-T G.8264, a specification document developed by the International Telegraph Union (ITU)'s Telecommunication Standardization Sector (ITU-T), which is available online e.g., at the following https www link: itu.int/rec/T-REC-G.8264, and specifies the Ethernet Synchronization Messaging Channel (ESMC). For example, if the network uses SyncE and a given net element aka network device is the last device in a SyncE chain, ESMC messages (e.g., as defined on ITU-T G.8264) may be sent from a SyncE device at least once a second, and may be used to declare the clock quality. If the SW receiving these messages recognizes that its link partner has a clock quality better than or more accurate than its own local clock quality—the software typically starts tracking this link partner frequency, extracting and using this link partner's frequency, as described herein.

However, embodiments herein may be used without a SyncE link partner, in which case the protocol may be similar to ESMC and may also be characterized as follows:

The protocol may carry information regarding neighbors' (e.g., link partners') clock quality. This quality may for example be represented by SSM codes and Enhanced SSM codes (used in ESMC) or may, alternatively, use different codes. The protocol may, alternatively or in addition, carry other information on the frequency stability of the clock such as the expected frequency stability at different temperatures and/or over different periods (short/long term stability). The device symbol rate may be synchronized to an external frequency source, such as GPS or SyncE.

The protocol may, alternatively or in addition, carry a clock identifier (e.g., A unique bit sequence per clock), which may be used by the time source selection SW to identify each clock.

Messages may be sent by each network element to its link partners and may not be forwarded by any network element. Information may be exchanged in a handshake procedure or may be announced periodically (e.g., heartbeat message, periodically e.g., each second). In the event of a change in the quality level e.g., of link partners' clock/s, a special message announcing the change may be transmitted.

It is appreciated that NICs are referred to herein, being an example a network device. However, the embodiments herein are not limited in their applicability, and, instead may be implemented in any network device such as, by way of non-limiting example, a NIC, data processing unit aka DPU (data processing unit), or switch.

The term "master" (or "reference") is used herein to describe a network element which is followed by other ("follower" or "slave") network elements. Typically, messages sent between network elements (such as periodic and/or special SyncE messages) affect each network element's decision of who to follow at any given time, e.g., as described herein. It is appreciated that given a network topology, some network elements (e.g., "leaves") may not be followed by any other network element. Absence of messages may also affect each network element's decision of who to follow at any given time, e.g., if the network element expected a message from a given link partner within a given time period, and failed to receive same.

The term "Network device" (aka network element) as used herein, is intended to include, by way of non-limiting example, a switch, network interface card (NIC) such as a smart NIC, router, or DPU.

The terms "RX symbol rate" and "RX frequency" may be interchanged herein.

The terms "TX symbol rate" and "TX frequency" may be interchanged herein.

The term "all" is used herein for simplicity, to describe example embodiments. It is appreciated, however, that alternatively, whatever is said herein to be true of or to characterize or to pertain to, "all" members of, or "each" member of, or "every" member of, a certain set can also, in other embodiments, be true of, or characterize or pertain to, most but not all members of that set, or all but a few members of that set, or at least one (but less than all) member/s of the set.

For example, a selection algorithm may compare quality and/or manually configurable priority and/or other features of all sources in a set of available timing sources. But, alternatively, most, but not all sources, or all but a few sources, or at least one (but less than all) source in that set, may be compared.

The specific embodiments shown and described herein are not intended to be limiting. Any detail therewithin may for example be provided, or not provided, in conjunction with a general system which measures TX and/or RX on a local device and on the local device's link partner/s and, accordingly, generates an output which controls frequency adjustments in hardware, rather than, necessarily, using the local device's controller's firmware to facilitate the local device's PHC frequency adjustments.

It is appreciated that software components of the present invention may, if desired, be implemented in ROM (read only memory) form. The software components may, generally, be implemented in firmware or hardware, if desired, using conventional techniques. It is further appreciated that the software components may be instantiated, for example as a computer program product, or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately, or in any suitable sub-combination.

It will be appreciated by persons skilled in the art that the present invention is not limited by what has been particularly shown and described hereinabove. Rather, the scope of the invention includes, inter alia, the appended claims and equivalents thereof.

The invention claimed is:

1. A system, comprising:
two or more network elements, each network element comprising a Precision Time Protocol (PTP) Hardware Clock (PHC) that is adjustable based, at least in part, on physical layer frequency information, wherein the physical layer frequency information is extracted from an RX symbol rate.

2. The system of claim 1, wherein at least one of the two or more network elements comprises a cellular network element.

3. The system of claim 2, wherein the two or more network elements comprise a first antenna and a second antenna.

4. The system of claim 1, wherein a switch extracts the physical layer frequency information to determine an ensemble time, and wherein the ensemble time is used to adjust the PHC's frequency and the PHC's TX symbol rate.

5. The system of claim 4, wherein the switch determines the ensemble time based on at least a first RX symbol rate received from at least a first network element and based on at least a second RX symbol rate received from at least a second network element.

6. The system of claim 1, wherein the two or more network elements belong to a subnetwork that includes a switch.

7. A system, comprising:
two or more network elements, each network element comprising a Precision Time Protocol (PTP) Hardware Clock (PHC) that is adjustable based, at least in part, on physical layer frequency information, wherein at least one of the two or more network elements comprises a data center element belonging to a data center cluster.

8. The system of claim 7, wherein the data center element comprises a Top-of-Rack (ToR) switch.

9. A cellular network, comprising:
a first cellular network element comprising a first Precision Time Protocol (PTP) Hardware Clock (PHC) that is adjustable based, at least in part, on physical layer frequency information; and
a second cellular network element comprising a second PHC that is adjustable based, at least in part, on the physical layer frequency information, wherein the physical layer frequency information is extracted from an RX symbol rate.

10. The cellular network of claim 9, wherein the RX symbol rate corresponds to an RX symbol rate of the first cellular network element, the second cellular network element, or both.

11. The cellular network of claim 9, further comprising a switch, wherein a local clock at the switch is adjusted based on a weighted average of two or more RX symbol rates, and wherein the local clock is used to align the first PHC and the second PHC.

12. The cellular network of claim 9, wherein the first cellular network element comprises a first antenna, and wherein the second cellular network element comprises a second antenna.

13. The cellular network of claim 9, wherein the first cellular network element and the second cellular network element belong to a common micro cell.

14. The cellular network of claim 9, wherein the physical layer frequency information is extracted from a difference between the RX symbol rate and a TX symbol rate or from a difference between the RX symbol rate and the PHC.

15. A data center, comprising:
a first network element and a second network element, wherein the first network element comprises a first Precision Time Protocol (PTP) Hardware Clock (PHC) that is adjustable based, at least in part, on physical layer frequency information, and wherein the second network element comprises a second PHC that is adjustable based, at least in part, on the physical layer frequency information, wherein the physical layer frequency information is used to determine an ensemble time, and wherein the ensemble time is used to adjust the first PHC's frequency.

16. The data center of claim 15, wherein the first network element comprises a first Network Interface Controller (NIC), and wherein the second network element comprises a second NIC.

17. The data center of claim 15, wherein the physical layer frequency information is received from a switch.

18. The data center of claim 17, wherein the switch is external to a subnetwork containing the first network element and the second network element.

19. The data center of claim 15, wherein the physical layer frequency information is extracted from an RX symbol rate.

20. The data center of claim 15, wherein the ensemble time is used to adjust the second PHC's frequency.

21. The data center of claim 15, wherein the first and second network elements are connected in a back-to-back configuration.

22. The data center of claim 15, wherein the first and second network elements are connected in a ring topology.

* * * * *